(12) United States Patent
Ishiwata

(10) Patent No.: US 8,281,257 B2
(45) Date of Patent: Oct. 2, 2012

(54) DATA DISPLAY APPARATUS, METHOD OF CONTROLLING THE SAME, AND COMPUTER PROGRAM

(75) Inventor: Hidenori Ishiwata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 12/646,693

(22) Filed: Dec. 23, 2009

(65) Prior Publication Data

US 2010/0175032 A1 Jul. 8, 2010

(30) Foreign Application Priority Data

Jan. 7, 2009 (JP) ................................. 2009-001823

(51) Int. Cl.
*G06F 3/048* (2006.01)
(52) U.S. Cl. .................. 715/853; 707/786; 707/829
(58) Field of Classification Search .................. 715/853; 707/786, 829
See application file for complete search history.

(56) References Cited

U.S. PATENT DOCUMENTS

| | | | | |
|---|---|---|---|---|
| 5,832,470 A * | 11/1998 | Morita et al. | ......................... | 1/1 |
| 6,065,015 A * | 5/2000 | Kazami | ........................... | 352/67 |
| 6,161,130 A * | 12/2000 | Horvitz et al. | ................ | 709/206 |
| 6,535,230 B1 * | 3/2003 | Celik | ............................. | 715/769 |
| 6,643,641 B1 * | 11/2003 | Snyder | ......................... | 707/709 |
| 7,370,281 B2 * | 5/2008 | Weber | ......................... | 715/769 |
| 7,420,526 B2 * | 9/2008 | Morita | ......................... | 345/1.1 |
| 2003/0041072 A1 * | 2/2003 | Segal et al. | ................ | 707/104.1 |
| 2003/0142953 A1 * | 7/2003 | Terada et al. | ................... | 386/46 |
| 2004/0267793 A1 * | 12/2004 | Sato | ............................. | 707/100 |
| 2005/0177796 A1 * | 8/2005 | Takahashi | ..................... | 715/769 |
| 2009/0132965 A1 * | 5/2009 | Shimizu | ....................... | 715/853 |

FOREIGN PATENT DOCUMENTS

JP 2006-021347 1/2006

* cited by examiner

*Primary Examiner* — Phenuel Salomon
(74) *Attorney, Agent, or Firm* — Cowan, Liebowitz & Latman, P.C.

(57) ABSTRACT

A data display apparatus comprising, a display unit operable to hierarchically display a plurality of folders, a management unit operable to manage information associated with each of the plurality of folders, a determination unit operable to, when the display unit displays each of the plurality of folders, determine based on the information associated with the folder and acquired from the management unit whether to integrally display the folder and a plurality of lower folders included under the folder as an integrated folder, and a control unit operable to control to cause the display unit to perform integral display using the integrated folder when the determination unit has determined to perform the integral display.

8 Claims, 23 Drawing Sheets

FIG. 3

| ID | TYPE | NAME | PATH | OPEN / CLOSE STATE | CHILD FOLDER |
|---|---|---|---|---|---|
| 001 | FOLDER | TRAVEL | C:¥ | OPEN | PRESENT |
| 002 | FOLDER | HOKKAIDO | C:¥TRAVEL | OPEN | PRESENT |
| 003 | FOLDER | 2007/2/5 | C:¥TRAVEL¥HOKKAIDO | OPEN | PRESENT |
| 004 | FOLDER | SAPPORO | C:¥TRAVEL¥HOKKAIDO¥2007/2/5 | OPEN | PRESENT |
| 005 | FOLDER | A-KO | C:¥TRAVEL¥HOKKAIDO¥2007/2/5¥SAPPORO | CLOSE | ABSENT |
| 006 | FOLDER | B-TA | C:¥TRAVEL¥HOKKAIDO¥2007/2/5¥SAPPORO | CLOSE | ABSENT |
| 007 | FOLDER | C-MI | C:¥TRAVEL¥HOKKAIDO¥2007/2/5¥SAPPORO | CLOSE | ABSENT |
| 008 | FOLDER | 2007/2/6 | C:¥TRAVEL¥HOKKAIDO | OPEN | PRESENT |
| 009 | FOLDER | HAKODATE | C:¥TRAVEL¥HOKKAIDO¥2007/2/6 | OPEN | PRESENT |
| 010 | FOLDER | A-KO | C:¥TRAVEL¥HOKKAIDO¥2007/2/6¥HAKODATE | CLOSE | ABSENT |
| 011 | FOLDER | C-MI | C:¥TRAVEL¥HOKKAIDO¥2007/2/6¥HAKODATE | OPEN | ABSENT |
| 012 | DATA | SOUVENIR PHOTO | C:¥TRAVEL¥HOKKAIDO¥2007/2/6¥HAKODATE¥C-MI | – | – |
| 013 | FOLDER | OKINAWA | C:¥TRAVEL | OPEN | PRESENT |
| 014 | FOLDER | 2006/8/20 | C:¥TRAVEL¥OKINAWA | OPEN | PRESENT |
| 015 | FOLDER | NAHA | C:¥TRAVEL¥OKINAWA¥2006/8/20 | OPEN | PRESENT |
| 016 | FOLDER | B-TA | C:¥TRAVEL¥OKINAWA¥2006/8/20¥NAHA | CLOSE | ABSENT |
| 017 | FOLDER | 2006/8/21 | C:¥TRAVEL¥OKINAWA | OPEN | PRESENT |
| 018 | FOLDER | ISHIGAKI | C:¥TRAVEL¥OKINAWA¥2006/8/21 | OPEN | PRESENT |
| 019 | FOLDER | B-TA | C:¥TRAVEL¥OKINAWA¥2006/8/20¥ISHIGAKI | CLOSE | ABSENT |

| NAME | PATH |
|---|---|
| OKINAWA | C:¥TRAVEL |

| ID |
|---|
| 016 |
| 019 |

| DATA SET THRESHOLD |
|---|
| 3 |

| ID |
|---|
| 005 |
| 006 |
| 007 |

| ID | NAME 1 | NAME 2 | NUMBER OF DATA | ID BEFORE INTEGRATION |
|---|---|---|---|---|
| 005 | SAPPORO | A-KO | - | - |
| 006 | SAPPORO | B-TA | - | - |
| 007 | SAPPORO | C-MI | - | - |

| ID | NAME 1 | NAME 2 | NUMBER OF DATA | ID BEFORE INTEGRATION |
|---|---|---|---|---|
| 005 | SAPPORO | A-KO | 2 | - |
| 006 | SAPPORO | B-TA | 3 | - |
| 007 | SAPPORO | C-MI | 10 | - |

FIG. 16

| ID | NAME 1 | NAME 2 | NUMBER OF DATA | ID BEFORE INTEGRATION |
|---|---|---|---|---|
| - | SAPPORO | A-KO · B-TA | 5 | 005, 006 |
| 007 | SAPPORO | B-TA | 10 | - |

FIG. 17

| DATA SET THRESHOLD | DATA THRESHOLD |
|---|---|
| 3 | 4 |

| ATTRIBUTE ITEM OF OPEN TARGET FOLDER | ATTRIBUTE ITEM OF OPENED FOLDER |
|---|---|
| PERSON | - |

FIG. 28

| FOLDER NAME | FOLDER PATH | NUMBER OF TIMES OF OPENING | NUMBER OF TIMES OF OPERATIONS | OPERATION RATE |
|---|---|---|---|---|
| TRAVEL | C:¥ | 152 | 3 | 2% |
| HOKKAIDO | C:¥TRAVEL | 83 | 12 | 14% |
| 2007/2/5 | C:¥TRAVEL¥HOKKAIDO | 60 | 7 | 12% |
| SAPPORO | C:¥TRAVEL¥HOKKAIDO¥2007/2/5 | 55 | 4 | 7% |
| A-KO | C:¥TRAVEL¥HOKKAIDO¥2007/2/5¥SAPPORO | 36 | 33 | 92% |
| B-TA | C:¥TRAVEL¥HOKKAIDO¥2007/2/5¥SAPPORO | 51 | 45 | 88% |
| C-MI | C:¥TRAVEL¥HOKKAIDO¥2007/2/5¥SAPPORO | 47 | 40 | 85% |
| 2007/2/6 | C:¥TRAVEL¥HOKKAIDO | 73 | 9 | 12% |
| HAKODATE | C:¥TRAVEL¥HOKKAIDO¥2007/2/6 | 71 | 3 | 4% |
| A-KO | C:¥TRAVEL¥HOKKAIDO¥2007/2/6¥HAKODATE | 49 | 43 | 88% |
| C-MI | C:¥TRAVEL¥HOKKAIDO¥2007/2/6¥HAKODATE | 54 | 51 | 94% |
| OKINAWA | C:¥TRAVEL | 59 | 10 | 17% |
| 2006/8/20 | C:¥TRAVEL¥OKINAWA | 50 | 3 | 6% |
| NAHA | C:¥TRAVEL¥OKINAWA¥2006/8/20 | 48 | 6 | 13% |
| B-TA | C:¥TRAVEL¥OKINAWA¥2006/8/20¥NAHA | 42 | 37 | 88% |
| 2006/8/21 | C:¥TRAVEL¥OKINAWA | 46 | 2 | 4% |
| ISHIGAKI | C:¥TRAVEL¥OKINAWA¥2006/8/21 | 43 | 1 | 2% |
| B-TA | C:¥TRAVEL¥OKINAWA¥2006/8/21¥ISHIGAKI | 40 | 37 | 93% |

DATA DISPLAY APPARATUS, METHOD OF CONTROLLING THE SAME, AND COMPUTER PROGRAM

BACKGROUND OF THE INVENTION

1. Field of the Invention

The present invention relates to a data display apparatus, a method of controlling the same, and a computer program.

2. Description of the Related Art

A conventional method of displaying data stored in a file system or the like is a folder tree scheme which displays a tree of folders storing data. An example is the explorer function of Windows®. The explorer function allows a user to hierarchically manage data. However, when the number of stored data increases, and the number of folders and the number of layers become enormous, a wider area is required to display all data. It is therefore difficult to look over the entire structure on a display device such as a display. This degrades the user visibility. To solve this problem, when only one folder is displayed in a single layer of a folder tree, display of that layer is omitted, and the folders or files of a lower layer are displayed (Japanese Patent Laid-Open No. 2006-021347).

In the conventional folder tree display method, however, there has been proposed no solution to look over the entire structure when a plurality of folders exist in a single layer, and the user visibility is still poor. Even when a single layer includes only one folder, information that should be obtained from the name of the undisplayed folder is lost so that it becomes difficult to grasp the contents of the folder.

SUMMARY OF THE INVENTION

One aspect of embodiments of the present invention relates to a data display apparatus comprising, a display unit operable to hierarchically displays a plurality of folders, a management unit operable to manage information associated with each of the plurality of folders, a determination unit operable to, when the display unit displays each of the plurality of folders, determine based on the information associated with the folder and acquired from the management unit whether to integrally display the folder and a plurality of lower folders included under the folder as an integrated folder, and a control unit operable to control to cause the display unit to perform integral display using the integrated folder when the determination unit has determined to perform the integral display.

Further features of the present invention will become apparent from the following description of exemplary embodiments (with reference to the attached drawings).

BRIEF DESCRIPTION OF THE DRAWINGS

FIG. 3 is a view showing an example of a folder layer management table according to the embodiment of the present invention;

FIG. 5 is a view showing an example of an opened-folder management table according to the embodiment of the present invention;

FIG. 6 is a view showing an example of an ID management table according to the embodiment of the present invention;

FIG. 7 is a view showing an example of a determination condition table according to the embodiment of the present invention;

FIG. 13 is a view showing an example of an ID management table according to the second embodiment of the present invention;

FIG. 14 is a view showing an example of a folder name generation table according to the second embodiment of the present invention;

FIG. 15 is a view showing another example of the folder name generation table according to the second embodiment of the present invention;

FIG. 16 is a view showing still another example of the folder name generation table according to the second embodiment of the present invention;

FIG. 17 is a view showing an example of a determination condition table according to the second embodiment of the present invention;

FIG. 28 is a view showing an example of an operation history management table according to the sixth embodiment of the present invention.

DESCRIPTION OF THE EMBODIMENTS

The embodiments of the present invention will now be described with reference to the accompanying drawings.

First Embodiment

A data display apparatus that is one of the embodiments of the data display apparatus according to the present invention will now be explained with reference to the accompanying drawings.

Figure 1:
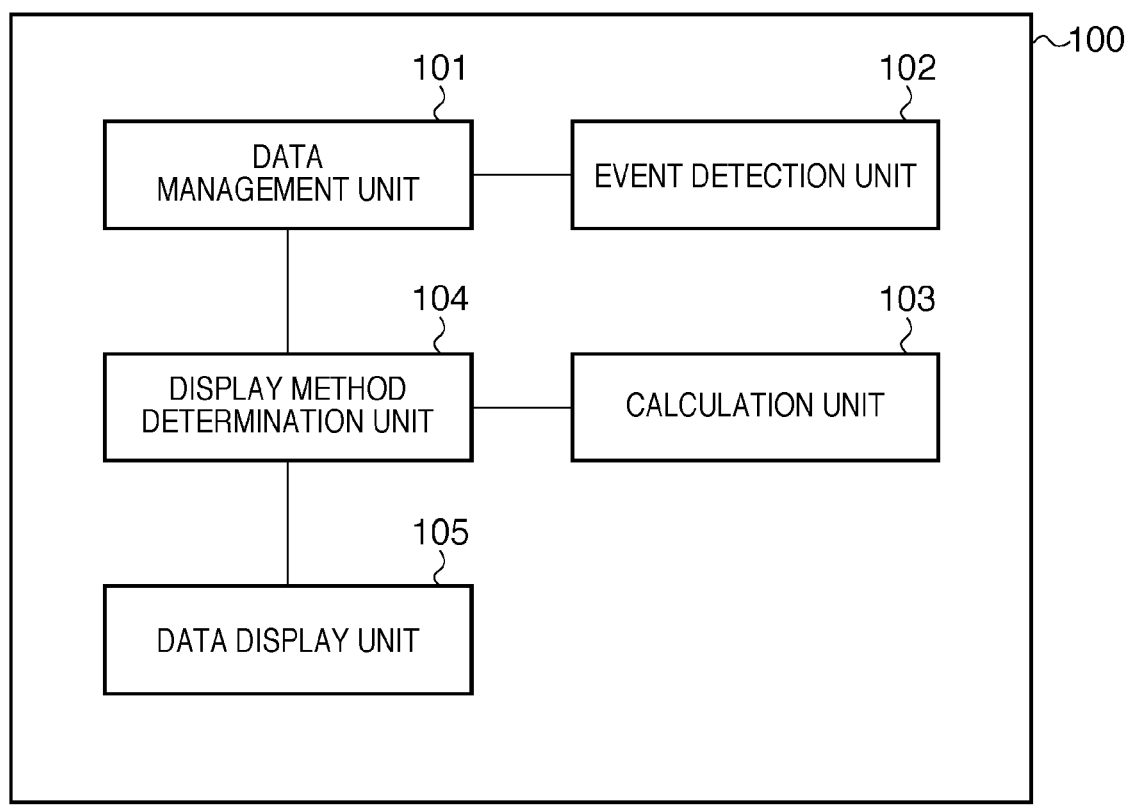
FIG. 1 is a block diagram showing an example of the functional arrangement of a data display apparatus according to the first and second embodiments of the present invention.

FIG. 1 is a block diagram showing an example of the functional arrangement of a data display apparatus 100 according to an embodiment of the present invention. The data display apparatus 100 includes a data management unit 101, event detection unit 102, calculation unit 103, display method determination unit 104, and data display unit 105.

The data management unit 101 manages the hierarchical structure of folders in a folder tree and data contained in each folder. Note that in this embodiment, a unit to manage a set of data will be referred to as a folder. The data management unit 101 manages addition, deletion, and movement of folders and data in a folder tree. The data management unit 101 also manages the open/close state of each folder.

A folder layer management table 300 managed by the data management unit 101 will be explained with reference to FIG. 3. FIG. 3 is a view showing an example of the arrangement of the folder layer management table 300 according to the embodiment of the present invention. In this embodiment, the folder layer management table 300 manages the following six items.

An identifier (ID) 301 uniquely specifies a management target.

A type 302 represents the type of a management target as "folder" or "data".

A name 303 indicates the name of a management target. Names include date/time information such as 2007/2/5 as well as "travel" and "Hokkaido".

A path 304 represents a storage location on a management target folder tree. For example, the folder of the uppermost layer of the tree is represented by "C:¥". A folder under it is indicated by, e.g., "C:¥travel".

When the type 302 is "folder", an open/close state 305 serves as a flag representing whether the folder is opened. "Open" indicates that the folder is opened, and "close" indicates that the folder is closed. Note that when the type 302 is "data", the flag value is invalid ("-").

When the type 302 is "folder", a child folder 306 serves as a flag representing whether another folder exists under that folder. "Present" indicates that a child folder exists, and "absent" indicates that no child folder exists. Note that when the type 302 is "data", the flag value is invalid ("-").

Figure 4:
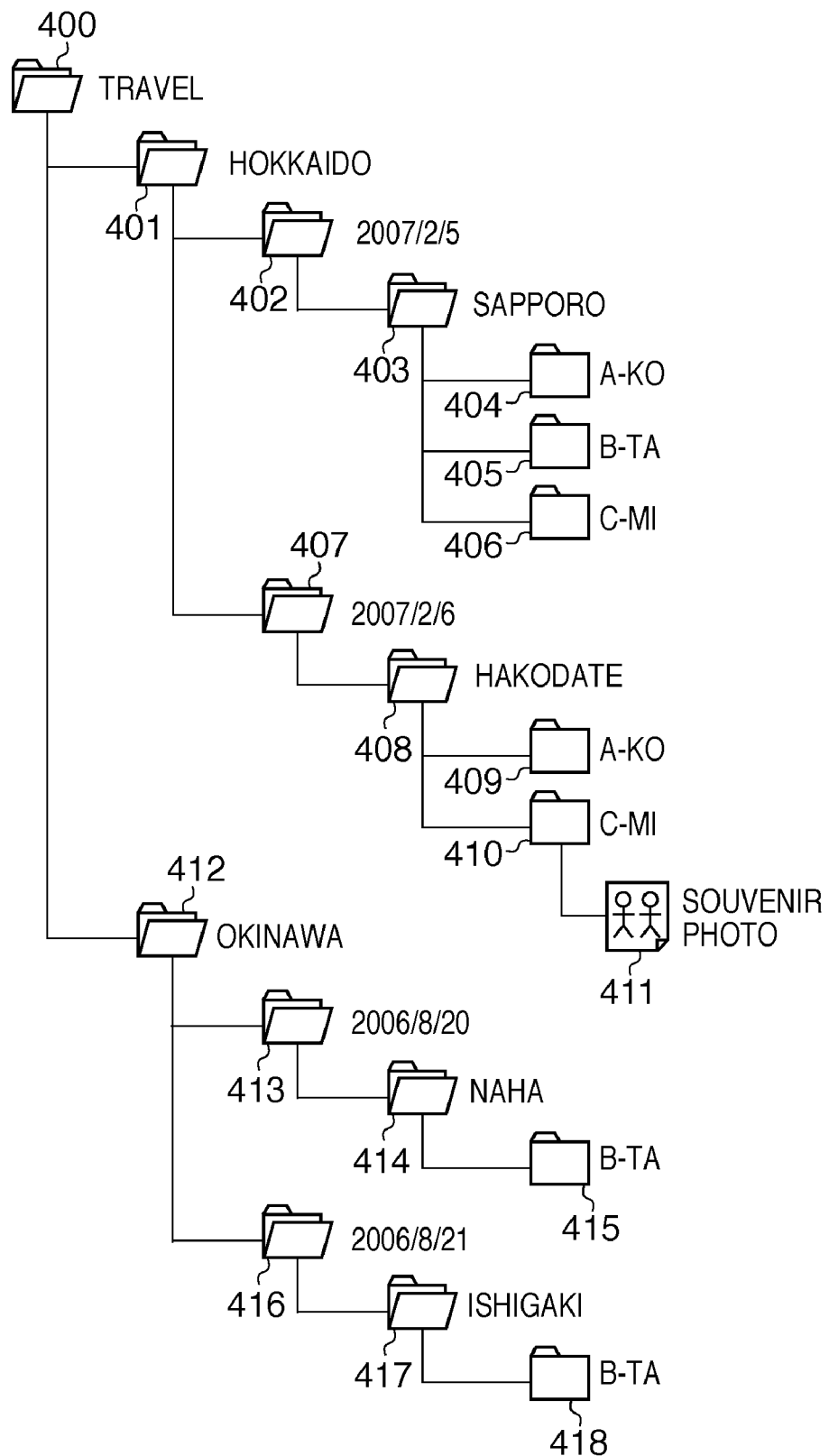
FIG. 4 is a view showing an example of a folder tree structure corresponding to the table in FIG. 3 according to the embodiment of the present invention.

FIG. 4 shows a folder tree structure corresponding to the table shown in FIG. 3. Referring to FIG. 4, a folder "C-mi 410" stores only souvenir photo data 411. However, the data can also be stored halfway through the folder layers. Referring back to FIG. 1, the event detection unit 102 detects that an operation such as folder opening has been performed for a data set. Upon detecting an operation such as folder opening via an input device 205 shown in FIG. 2 to be described later, the event detection unit 102 notifies the data management unit 101 of the information about the opened folder.

An example of an opened-folder management table 500 managed by the data management unit 101 will be described with reference to FIG. 5. FIG. 5 is a view showing an example of the opened-folder management table 500 according to the embodiment of the present invention. Referring to FIG. 5, a name 501 represents the name of an opened folder. A path 502 indicates a storage location on the folder tree. FIG. 5 illustrates an example in which a folder named "Okinawa" and stored under "C:¥travel" is opened.

The calculation unit 103 counts the number of lowermost layer folders contained under an opened folder detected by the event detection unit 102. A lowermost layer folder indicates a folder for which the flag of the child folder 306 is "absent" in the folder layer management table 300 shown in FIG. 3.

For example, in the folder tree shown in FIG. 4, five lowermost layer folders are contained under a folder "Hokkaido 401". More specifically, folders "A-ko 404", "B-ta 405", "C-mi 406", "A-ko 409", and "C-mi 410" are contained. In addition, the three lowermost layer folders "A-ko 404", "B-ta 405", and "C-mi 406" are contained under a folder "2007/2/5 402".

The display method determination unit 104 holds a condition for determining a display method of data set. FIG. 7 shows an example of a determination condition table 700 held by the display method determination unit 104. A data set threshold 701 is a criterion to be used to determine whether to integrally display a plurality of folder layers. In this embodiment, the data set threshold 701 is compared with the number of lowermost layer folders calculated by the calculation unit 103. When the number of lowermost layer folders is equal to or smaller than the threshold, an instruction is issued to integrally display a plurality of folder layers under the open target folder. In FIG. 7, "3" is set as the data set threshold. Hence, when the number of lowermost layer folders is 3 or less, the folder layers are integrally displayed.

For example, examine the folder tree shown in FIG. 4. When a folder "travel 400" is opened, there are seven lowermost layer folders. Hence, normal folder opening is performed to display the folders "Hokkaido 401" and "Okinawa 412". When the folder "Hokkaido 401" is opened, there are five lowermost layer folders. Hence, normal folder opening is performed to display the folders "2007/2/5 402" and "2007/2/6 407".

Figure 8A:
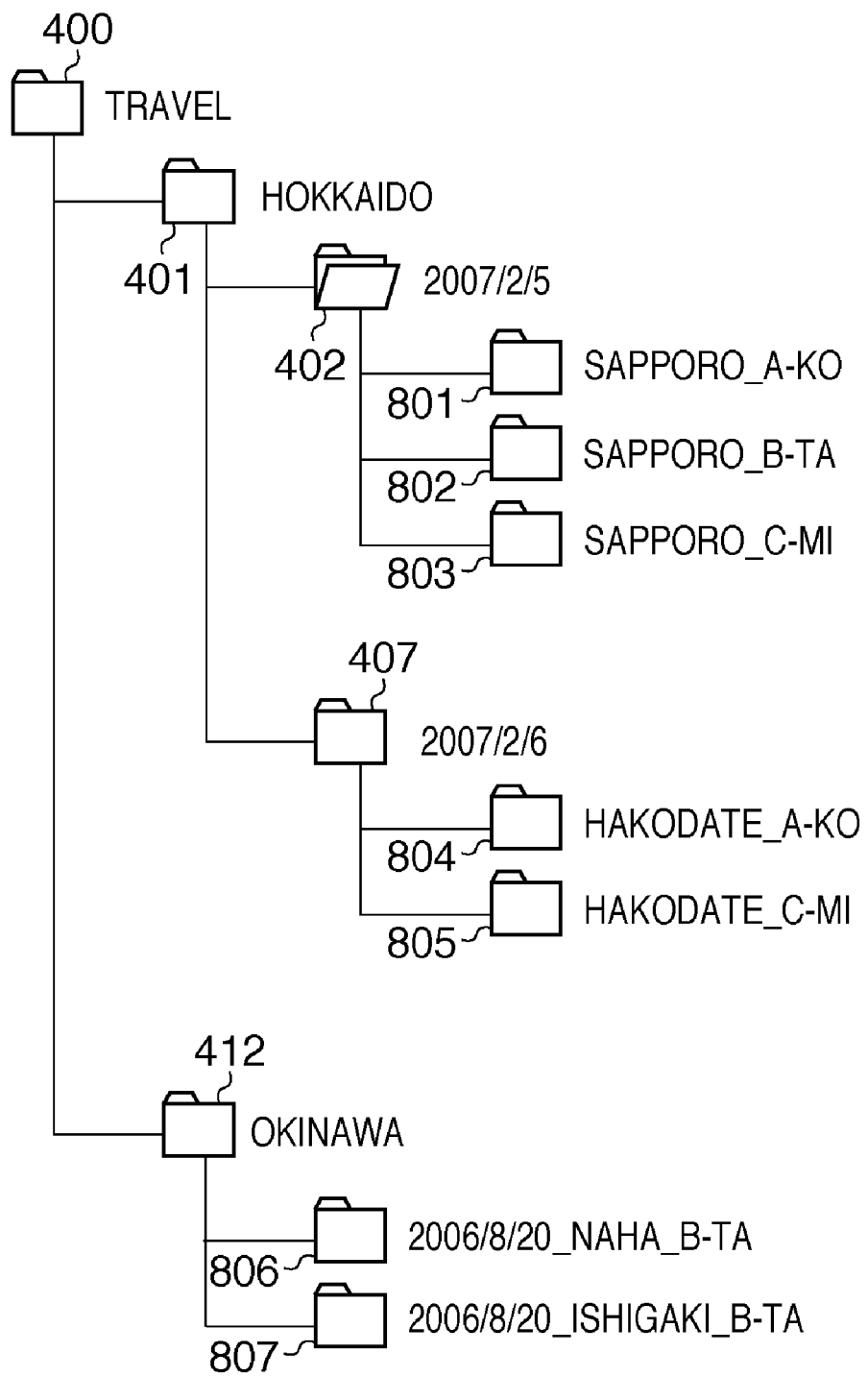
FIG. 8A is a view showing an example of an integrally displayed folder tree according to the first embodiment of the present invention.

When the folder "2007/2/5 402" is opened, the number of lowermost layer folders is "3" which is equal to or smaller than the data set threshold. Hence, as shown in FIG. 8A, folders "Sapporo_A-ko 801", "Sapporo_B-ta 802", and "Sapporo C-mi 803" are displayed by integrating folder layers under the folder "2007/2/5 402" into the respective lowermost layer folders. Similarly, when the folder "2007/2/6 407" is opened, folders "Hakodate_A-ko 804" and "Hakodate_C-mi 805" are displayed. When the folder "Okinawa 412" is opened, folders "2006/8/20_Naha_B-ta 806" and "2006/8/21_Ishigaki_B-ta 807" are displayed.

A detailed algorithm will be described later. Note that data which are not stored in the integrated folders can be displayed in the same layer as that of the integrated folders 801 to 803, directly as the folders before integration, or as partially integrated folders (e.g., "2006/8/20_Naha").

However, when forming a folder tree aiming at classification, most data are assumed to be stored in lowermost layer folders, and data halfway through the folder layers are not suitable for the classification. Hence, no specific implementation method will be mentioned in this embodiment.

The data display unit 105 performs integral display based on the display method determined by the display method determination unit 104.

Figure 2:
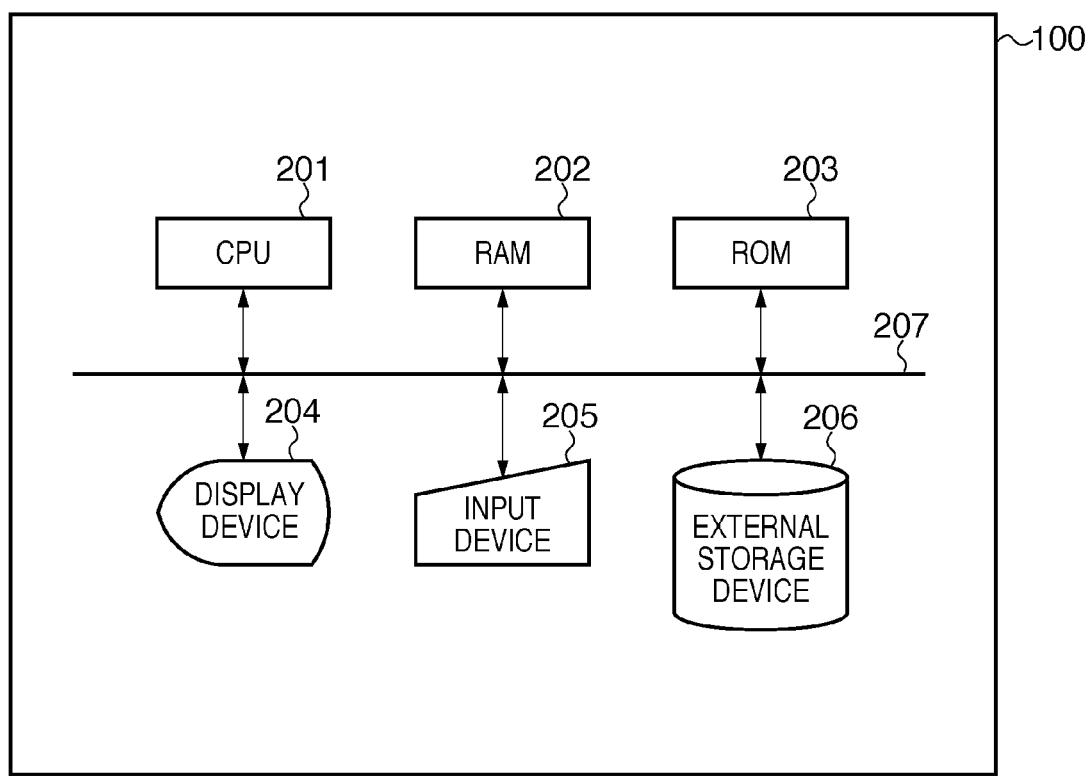
FIG. 2 is a block diagram showing an example of the hardware configuration of the data display apparatus according to the embodiment of the present invention.

FIG. 2 is a block diagram showing an example of the hardware configuration of the data display apparatus 100 according to the embodiment of the present invention. The data display apparatus 100 can be implemented as a personal computer (PC). Referring to FIG. 2, a CPU 201 controls the overall operation of the data display apparatus 100. A RAM 202 temporarily stores programs and data supplied from an external device or the like. A ROM 203 stores control programs and parameters which require no change. The CPU 201 can implement the functions of the process blocks 101 to 105 in FIG. 1 by executing the programs stored in the RAM 202 and thus controlling the operation of the data display apparatus 100.

A display device 204 implements folder tree display in the data display unit 105. The input device 205 serves as a user interface to receive inputs from the user and is formed from, e.g., a keyboard or a mouse. An external storage device 206 stores the folder structure in the data management unit 101 and a condition for determining a display method of data set in the display method determination unit 104. The external storage device 206 is implemented by a hard disk or the like. A system bus 207 communicably connects the units 201 to 206.

The operation of the data display apparatus 100 according to this embodiment will be described below. The process of each step to be explained below is implemented by executing a folder tree display program of the embodiment under the control of the CPU 201, unless it is specifically stated otherwise.

Figure 9:
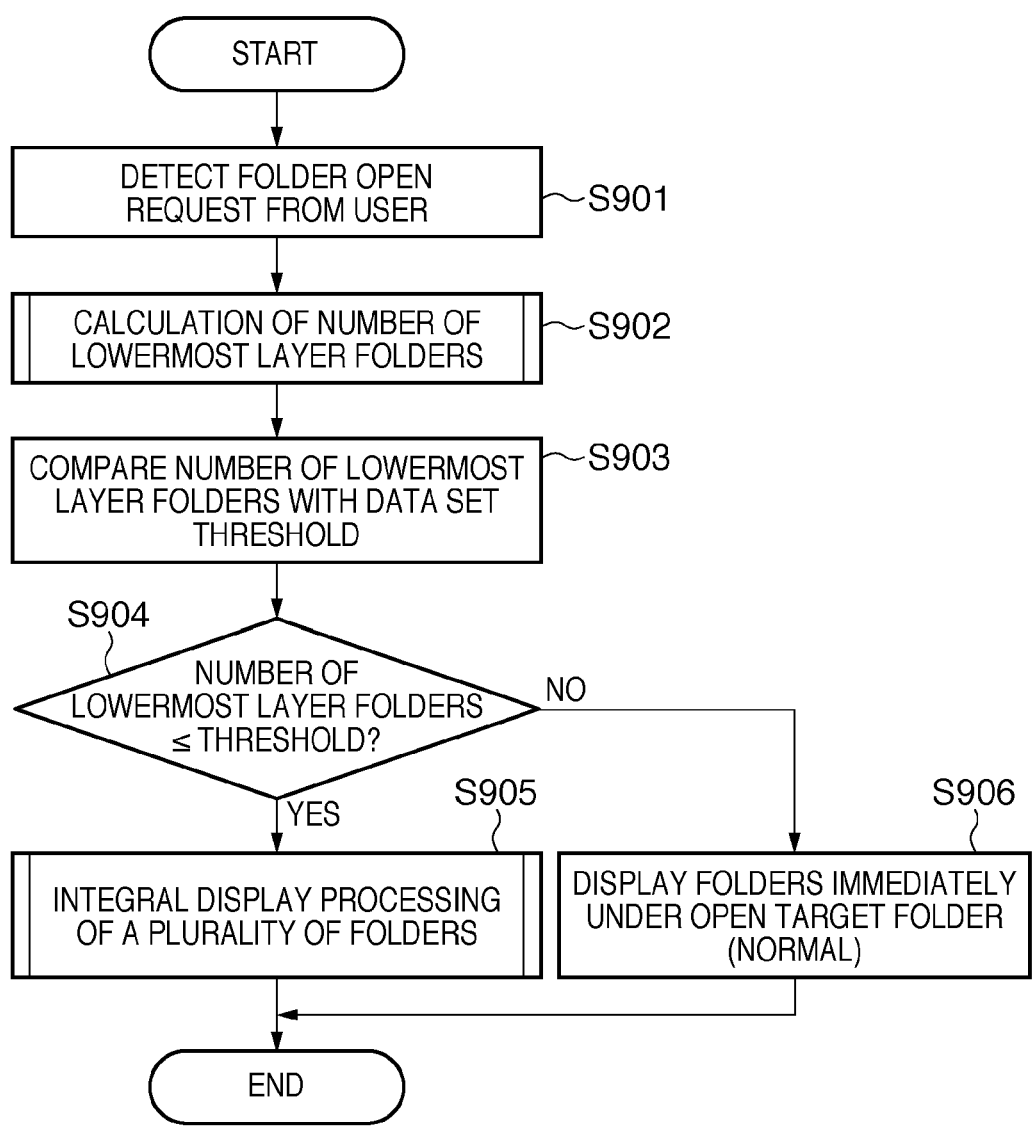
FIG. 9 is a flowchart illustrating an example of processing of the data display apparatus in opening a folder tree according to the embodiment of the present invention.

FIG. 9 is a flowchart illustrating an outline of processing of the data display apparatus when the user opens a folder tree in this embodiment. The procedure will be explained with reference to FIGS. 3 and 4. The processing is implemented by causing the CPU 201 to execute a program stored in the RAM 202 or the external storage device 206 and control the operation of the data display apparatus 100.

In step S901, the event detection unit 102 detects a folder open request input via the input device 205 by the user. Assume that the user has input an open instruction for the folder "Okinawa 412".

In step S902, the calculation unit 103 calculates the number of lowermost layer folders that exist under the open target folder. In this case, the number of lowermost layer folders is "2". The process of this step will be described later in detail with reference to FIG. 10.

In step S903, after obtaining the number of lowermost layer folders, the data set threshold managed in the determination condition table 700 is compared with the number of lowermost layer folders obtained as the result of calculation. If the result of comparison indicates that the value of the number of lowermost layer folders is equal to or smaller than the data set threshold ("YES" in step S904), the process advances to step S905.

In step S905, the plurality of folder layers under the open target folder are integrated into respective lowermost layer folders and integrally displayed. The folders "2006/8/20_Naha_B-ta 806" and "2006/8/21_Ishigaki_B-ta 807" in FIG. 8A are displayed. The process of this step will be described later in detail with reference to FIG. 11.

If the value of the number of lowermost layer folders is larger than the data set threshold ("NO" in step S904), the process advances to step S906. In step S906, not special processing but normal processing is performed to display the folders that exist immediately under the open target folder.

Figure 10:
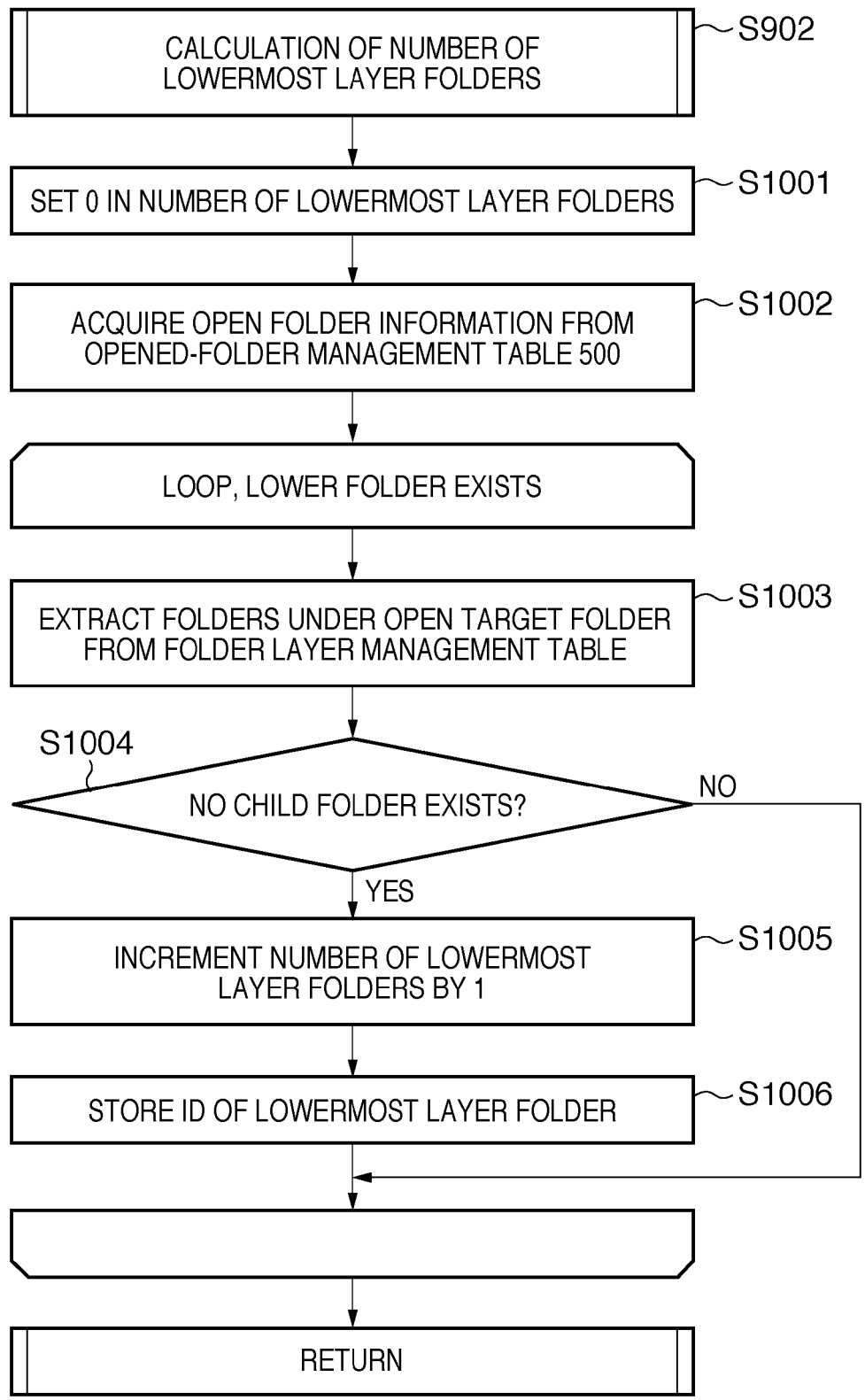
FIG. 10 is a flowchart illustrating an example of processing of calculating the number of lowest layer folders according to the first embodiment of the present invention.

The processing of calculating the number of lowermost layer folders in step S902 of FIG. 9 will be described next with reference to FIG. 10. FIG. 10 is a flowchart illustrating an example of processing of calculating the number of lowest layer folders according to the embodiment of the present invention. The procedure will be explained with reference to FIGS. 3 and 4.

In step S1001, 0 is set in a variable to count the number of lowermost layer folders before execution of the calculation processing.

In step S1002, the folder name 501 and path 502 that are information (open folder information) about the open target folder are acquired from the opened-folder management table 500. The folder name is "Okinawa", and the path is "C:¥travel".

In step S1003, based on the acquired folder information, folders under the open target folder are extracted from the folder layer management table 300.

More specifically, a path "C:¥travel¥Okinawa" is created by connecting the path 502 and name 501 acquired from the opened-folder management table 500. It is determined whether the connected path is included in the paths 304 managed in the folder layer management table 300. Folders whose paths include the connected path are extracted as folders under the open target folder. In this case, six folders whose IDs 301 are 014 to 019 managed in the folder layer management table 300 in FIG. 3 are extracted.

In step S1004, for each extracted folder, it is determined by referring to the child folder 306 of the folder layer management table 300 in FIG. 3 whether a child folder exists. If no child folder exists ("YES" in step S1004), the process advances to step S1005. On the other hand, if a child folder exists, the process returns to step S1003 to continue the processing.

In step S1005, the value of the variable to count the number of lowermost layer folders is incremented by one.

In step S1006, the IDs of folders concerned are stored in a lowermost layer folder ID management table 600 shown in FIG. 6 according to the process in S1005. Referring to FIG. 6, an ID 601 indicates a stored folder ID. The processes in steps S1003 to S1006 are repeatedly executed until no target lower folder remains.

Figure 11:
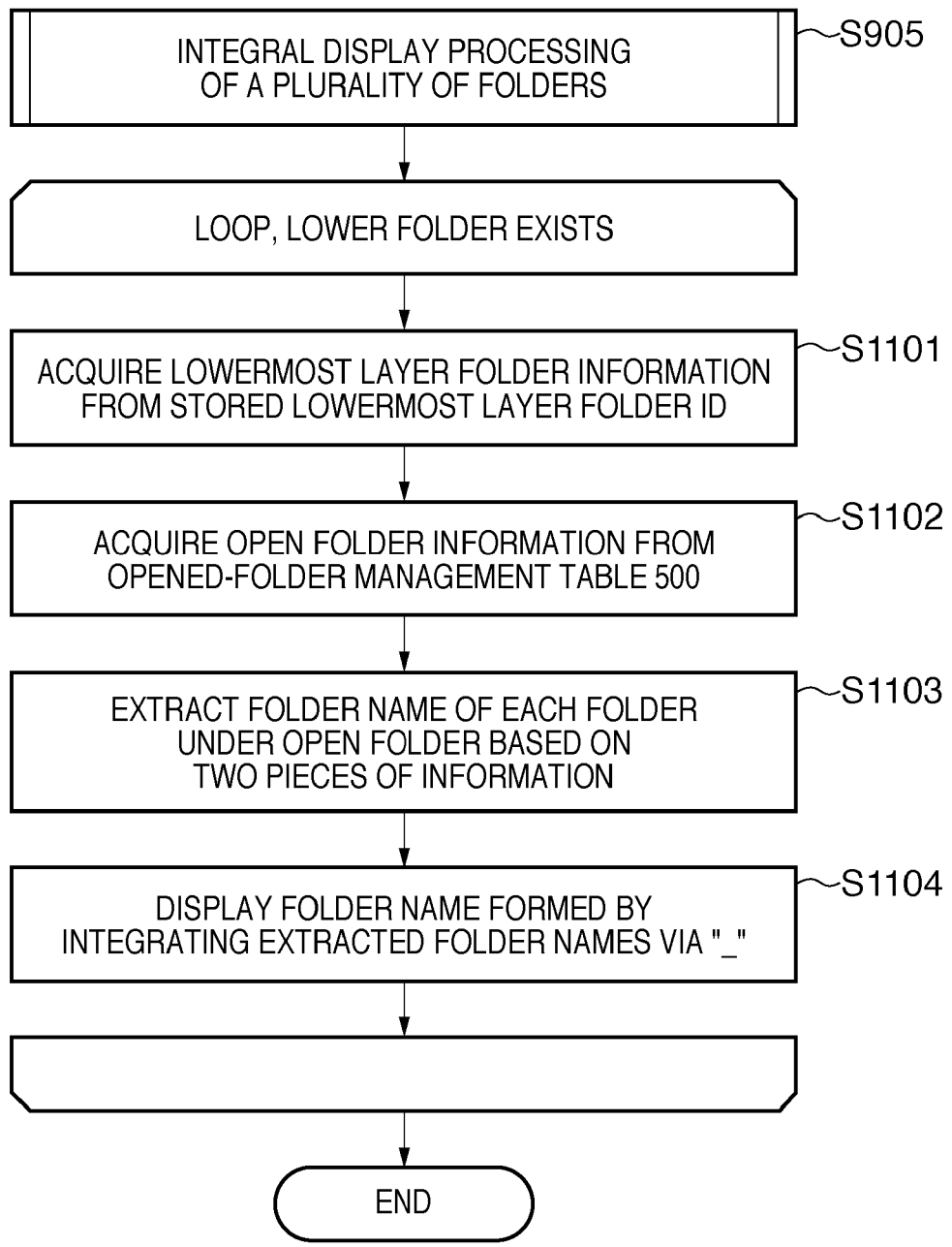
FIG. 11 is a flowchart illustrating an example of processing of integrally displaying a plurality of folders according to the first embodiment of the present invention.

Processing of integrally displaying a plurality of folders in step S905 of FIG. 9 will be described with reference to FIG. 11. FIG. 11 is a flowchart illustrating an example of processing of integrally displaying a plurality of folders according to the embodiment of the present invention. The same situation as in FIGS. 9 and 10 will be examined using FIGS. 3 and 4.

In step S1101, the pieces of information of folders concerned are acquired from the folder layer management table 300 based on the IDs managed in the ID management table 600. In this case, the pieces of two folders whose IDs 301 are 016 and 019 are acquired.

In step S1102, the name 501 and path 502 are acquired from the opened-folder management table 500.

In step S1103, all the names of folders under the open target folder are acquired from the folder name information contained in the two pieces of information acquired in steps S1101 and S1102. The path of the open target folder is generated as "C:¥travel¥Okinawa" based on the information stored in the opened-folder management table 500. This path is compared with the pieces of path information "C:¥travel¥Okinawa¥2006/8/20¥Naha¥B-ta" and "C:¥travel¥Okinawa¥2006/8/21¥Ishigaki¥B-ta" included in the folder information acquired from the IDs managed in the ID management table 600. More specifically, "C:¥travel¥Okinawa" is compared with "C:¥travel¥Okinawa¥2006/8/20¥Naha¥B-ta". In addition, "C:¥travel¥Okinawa" is compared with "C:¥travel¥Okinawa¥2006/8/21¥Ishigaki¥B-ta". This comparison allows to extract differential folder names {"2006/8/20", "Naha", and "B-ta"} and {"2006/8/21", "Ishigaki", and "B-ta"}.

In step S1104, the extracted folder names are connected via "underbars" "_" so that "2006/8/20_Naha_B-ta" and "2006/8/21_Ishigaki_B-ta" are displayed as the names of integrated folders. Note that the setting method is merely an example, and the procedure can be implemented by various methods such as intellectually generating a folder name, as a matter of course.

If an open instruction for an integrated folder is input, data stored in all folders contained in the integrated folder upon its opening are displayed as data stored in the integrated folder. More specifically, when the folder "2006/8/20_Naha_B-ta 806" shown in FIG. 8A is opened, data equivalent to a result obtained by opening the "B-ta 415" shown in FIG. 4 is displayed.

In the above-described embodiment, the folder integration processing is performed when a folder open request has been issued. However, the processing may be done when a change such as data addition or deletion has occurred.

Figure 8B:
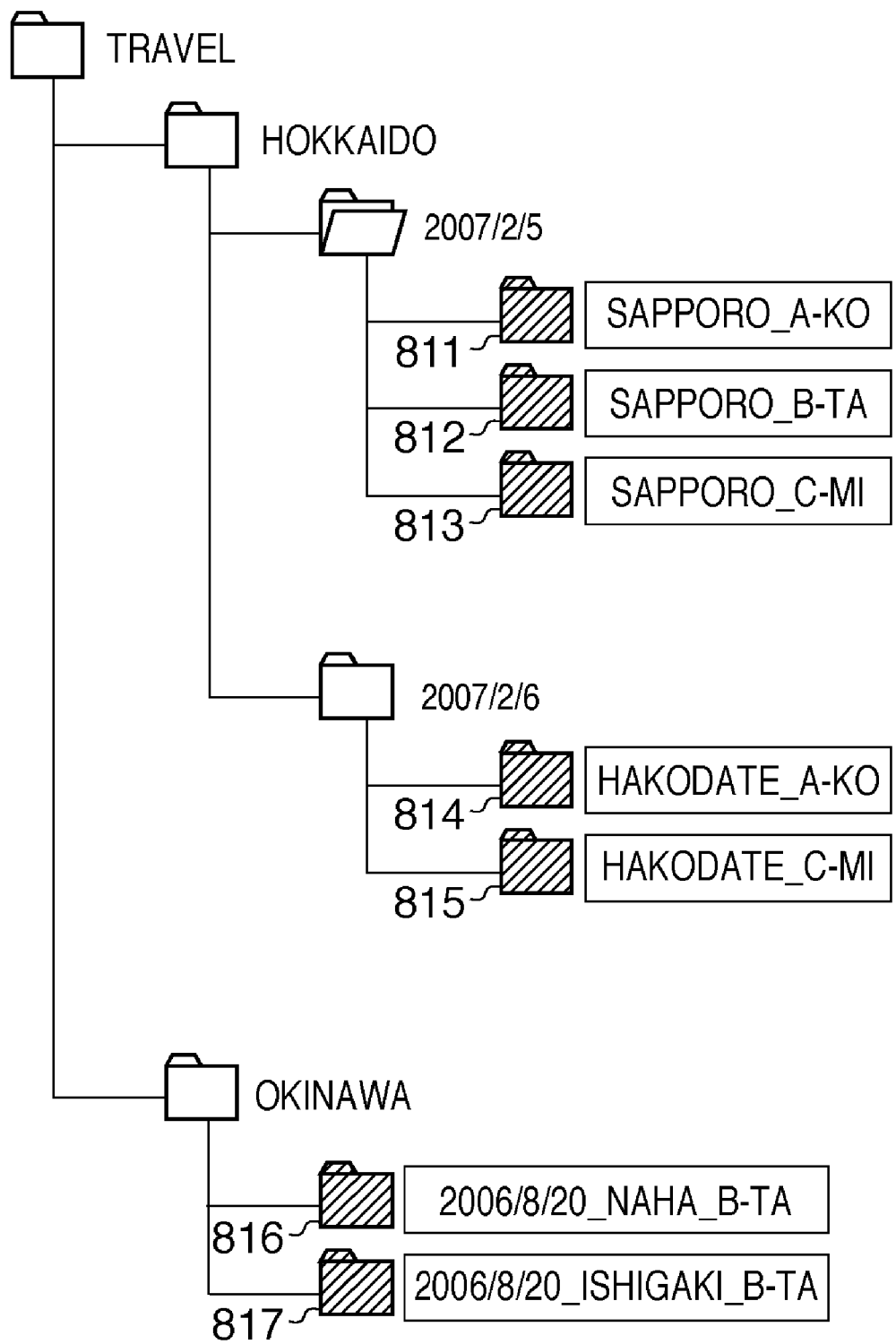
FIG. 8B is a view showing another example of the integrally displayed folder tree according to the first embodiment of the present invention.

In FIG. 8A, the integrated folders each formed by integrating a plurality of folders are displayed without discrimination from normal single folders. However, the integrated folders and single folders may be displayed identifiably. For example, as shown in FIG. 8B, the integrated folders may be displayed in a color different from that of single folders. Alternatively, the folder names of the integrated folders may be highlighted so as to discriminate them from the single folders. In FIG. 8B, folders 811 to 817 are integrated folders.

As described above, it is possible to prevent the display layer from becoming deeper by changing, in accordance with the number of lowermost layer folders, the display form of a folder opened based on an open instruction. Additionally, since the name of an integrated folder is generated by merging the names of folders to be integrated, information that should be obtained from the name of an undisplayed folder is not lost. This allows to implement data display with high visibility for the user.

Second Embodiment

The fundamental arrangement of the second embodiment of the present invention is based on the first embodiment. However, unlike the first embodiment, not only the number of lowermost layer folders but also the number of data in each lowermost layer folder is used as a condition for determining a display method of data set when integrally displaying a plurality of folder layers. As a characteristic feature of the second embodiment, when a plurality of lowermost layer folders that store a few data exist, those folders can be displayed integrally.

Figure 12:
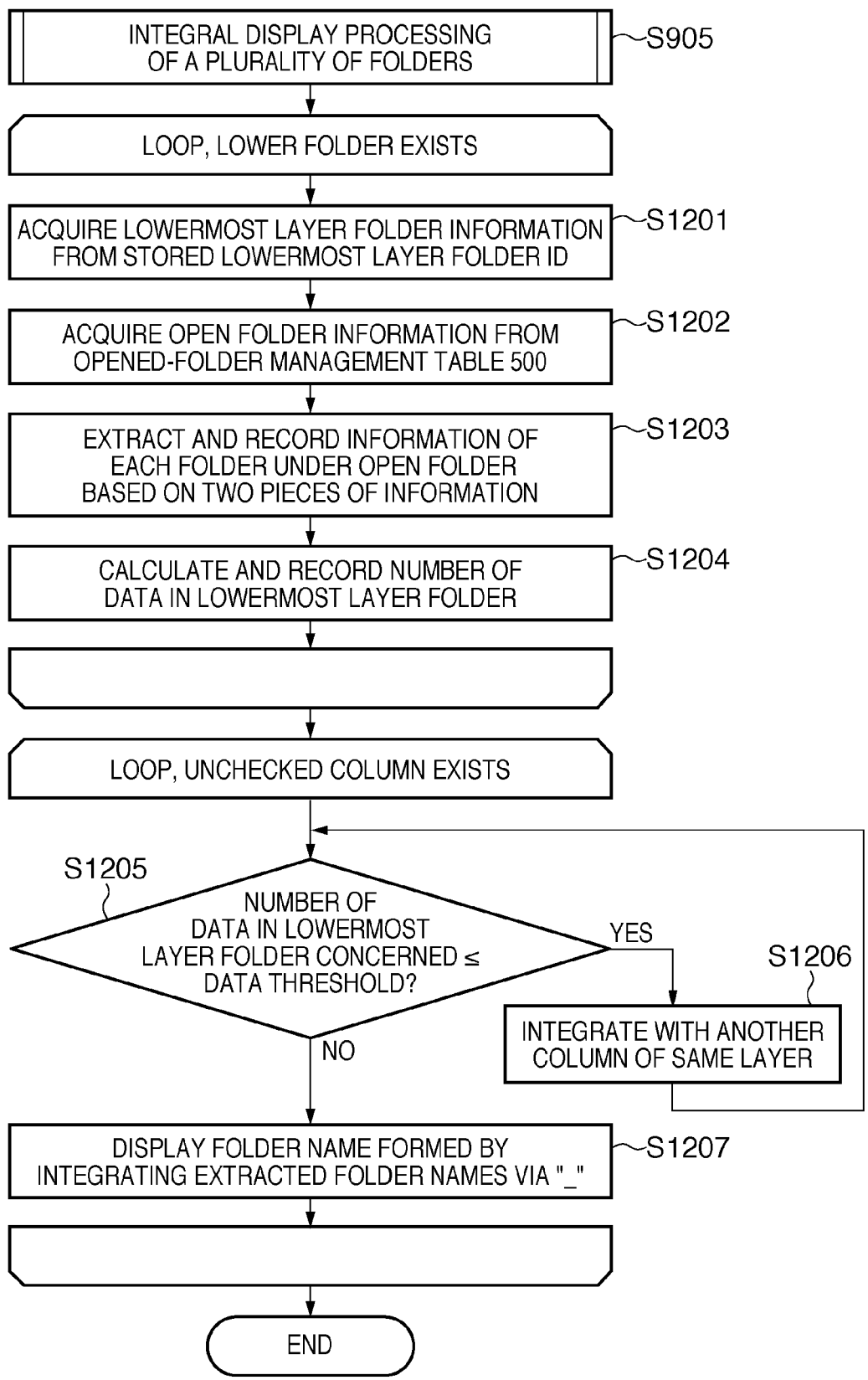
FIG. 12 is a flowchart illustrating an example of processing of integrally displaying a plurality of folders according to the second embodiment of the present invention.

Processing of integrally displaying a plurality of folders using the number of lowermost layer folders and the number of data in each lowermost layer folder according to this embodiment will be described with reference to FIG. 12. FIG. 12 is a flowchart illustrating an example of processing of integrally displaying a plurality of folders according to the second embodiment of the present invention. An example will be explained here in which a folder "2007/2/5 402" in FIG. 4 is opened.

In step S1201, pieces of information of lowermost layer folders are acquired. More specifically, the pieces of information are acquired from a folder layer management table 300 based on IDs (IDs 005 to 007 of lowermost layer folders under the folder "2007/2/5 402") managed in an ID management table 1300. ID information registration in the ID management table 1300 is done for folders having a flag "absent" by referring to a child folder 306 of the folder layer management table 300 in FIG. 3.

In step S1202, a folder name 501 and path 502 are acquired from an opened-folder management table 500. All the names of folders under the open target folder are acquired from the folder name information contained in the two pieces of information acquired in the above steps. In this case, the names of three sets "Sapporo" and "A-ko", "Sapporo" and "B-ta", and "Sapporo" and "C-mi" are acquired.

In step S1203, the following five kinds of information are recorded in a folder name generation table 1400 shown in FIG. 14. Items managed in the folder name generation table 1400 are as follows.

An ID 1401 is identical to an ID 301 managed in the folder layer management table 300. A name 1 1402 indicates the name of a folder (folder names equal in number to folder layers are listed in a comma delimited format and managed) included under the open target folder except lowermost layer folders. A name 2 1403 indicates the name of a lowermost layer folder that exists under the name 1 1402. The number 1404 of data represents the number of data stored in a lowermost layer folder. When the number of data in a lowermost layer folder is small, processing of integrating a plurality of folders is executed. An ID 1405 before integration indicates the ID of each lowermost layer folder integrated at that time (IDs equal in number to the integrated folders are stored).

In step S1204, the number of data stored in each lowermost layer folder is calculated. The calculated value is stored in the number 1404 of data of the folder name generation table 1400. As the calculation method, the number of data whose path information is the same as that of the target lowermost layer folder is confirmed based on the data managed in the folder layer management table 300. FIG. 15 shows the folder name generation table 1400 whose number 1404 of data is updated.

In step S1205, after confirming the number of data in each lowermost layer folder, it is determined whether the number of data in each lowermost layer folder is equal to or smaller than a data threshold.

FIG. 17 is a view showing an example of a determination condition table 1700. Reference numeral 1701 denotes a data set threshold; and 1702, a data threshold. The above determination is done based on the data threshold 1702. If it is determined that the number of data in a lowermost layer folder is equal to or smaller than the threshold ("YES" in step S1205), the process advances to step S1206. In step S1206, the data stored in the folder name generation table 1400 are put together. This adjusts the number of data in the lowermost layer folder to be larger than the data threshold 1702. This process aims at preventing the visibility of the folder tree from becoming low for the user because the number of data is small but the number of folders is large.

In the folder name generation table 1400 shown in FIG. 15, the lowermost layer folder of the first line, whose ID 1401 is "005", stores two data. The number of data is smaller than the data threshold 1702. Hence, the folder is displayed integrally with the lowermost layer folder of the second line, whose ID 1401 is "006". The integration is implemented by putting the different names 2 1403 which represent folder names "A-ko" and "B-ta" together without processing the name 1 1402 which represents the same folder name "Sapporo". In this example, the folder name is expressed as "A-ko•B-ta" including "•" inserted between the folder names to be connected. In this example, the lowermost layer folder having the ID 1401 "005" and containing data in number smaller than the data threshold 1702 is integrated with the lowermost layer folder whose ID 1401 is "006". Instead, more intellectual processing may be executed by confirming the number of data in each lowermost layer folder and integrating two lowermost layer folders that store a minimum number of data.

FIG. 16 shows the folder name generation table 1400 after integration. Since the folders are integrated, values corresponding to the item of the ID 1401 are not included. "A-ko•B-ta" formed by merging the two folder names before integration is stored in the item of the folder name represented by the name 2 1403. The item of the number 1404 of data stores "5" that is the total number of data in the two lowermost layer folders. The IDs "005, 006" of the lowermost layer folders before integration are registered in the item of the ID 1405 before integration.

After the integration processing, the number 1404 of data in the integrated folder is compared with the data threshold 1702 again in step S1205. If the number of data in the integrated folder is larger than the threshold ("NO" in step S1205), the process advances to step S1207. In step S1207, the values of the items of the folder names 1402 and 1403 are connected via an "underbar "_"" so that "Sapporo_A-ko•B-ta" is displayed as the name of the integrated folder. If the number of data in the integrated folder is equal to or smaller than the data threshold ("YES" in step S1205), the processing is repeatedly executed until the number of data becomes larger than the threshold.

Figure 18:
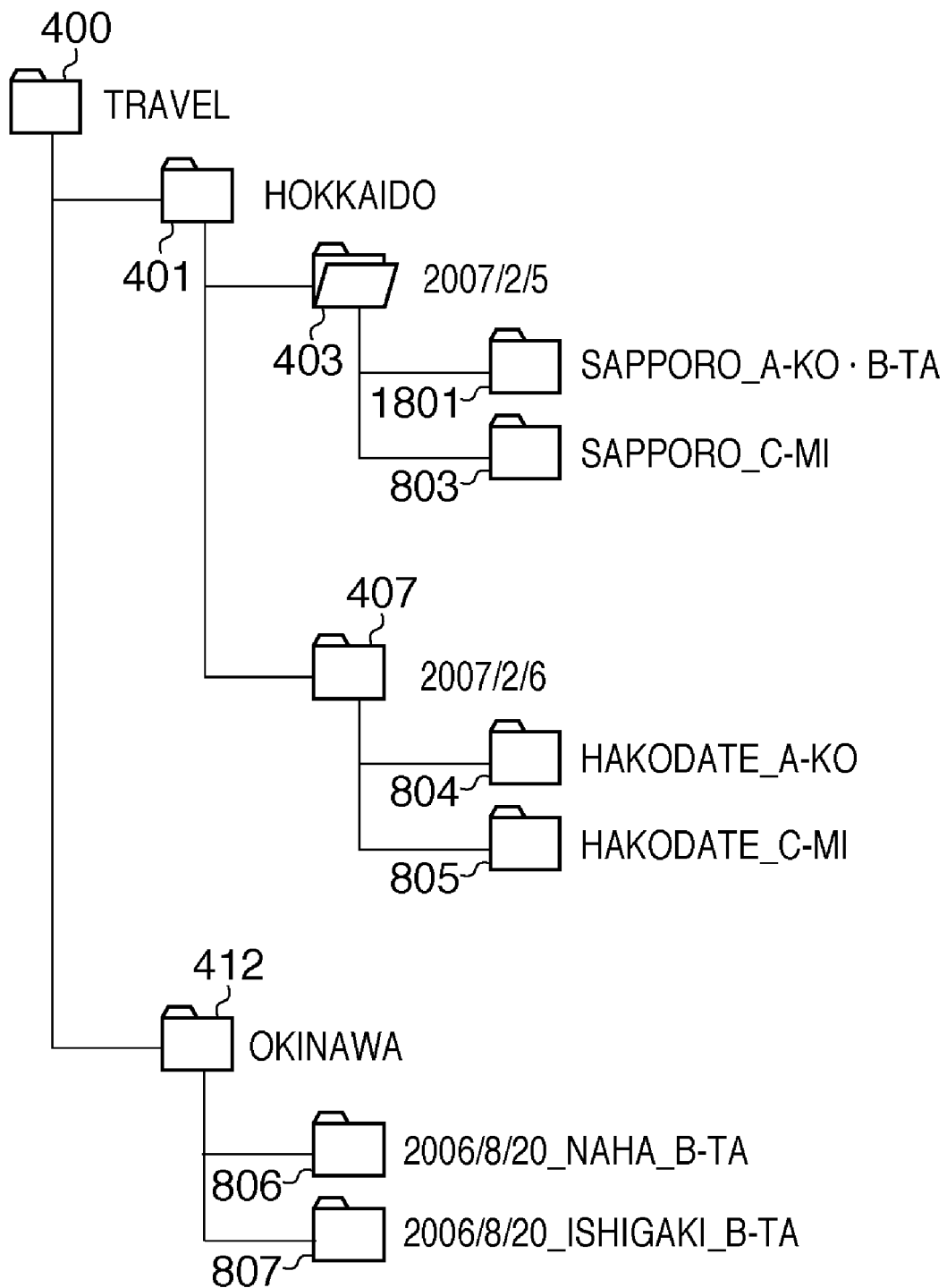
FIG. 18 is a view showing an example of an integrally displayed folder tree according to the second embodiment of the present invention.

FIG. 18 shows a display example of the folder tree in step S1207. A folder 1801 is a folder displayed integrally based on the number of lowermost layer folders and the number of data in each lowermost layer folder. When the folder 1801 is opened, data contained in folders "A-ko 404" and "B-ta 405" shown in FIG. 4 are displayed together.

As described above, in this embodiment, when a plurality of lowermost layer folders that store a few data exist, it is possible to implement data display with high visibility for the user by integrally displaying those folders.

Third Embodiment

The fundamental arrangement of the third embodiment of the present invention is based on the first embodiment. However, unlike the first embodiment, a relation is defined in advance between folders, and a plurality of folder layers are integrally displayed in accordance with the definition. This embodiment is applied to a classification folder tree. A classification folder tree is a folder tree which hierarchically classifies stored data based on the attribute values of attribute items.

Figure 22:
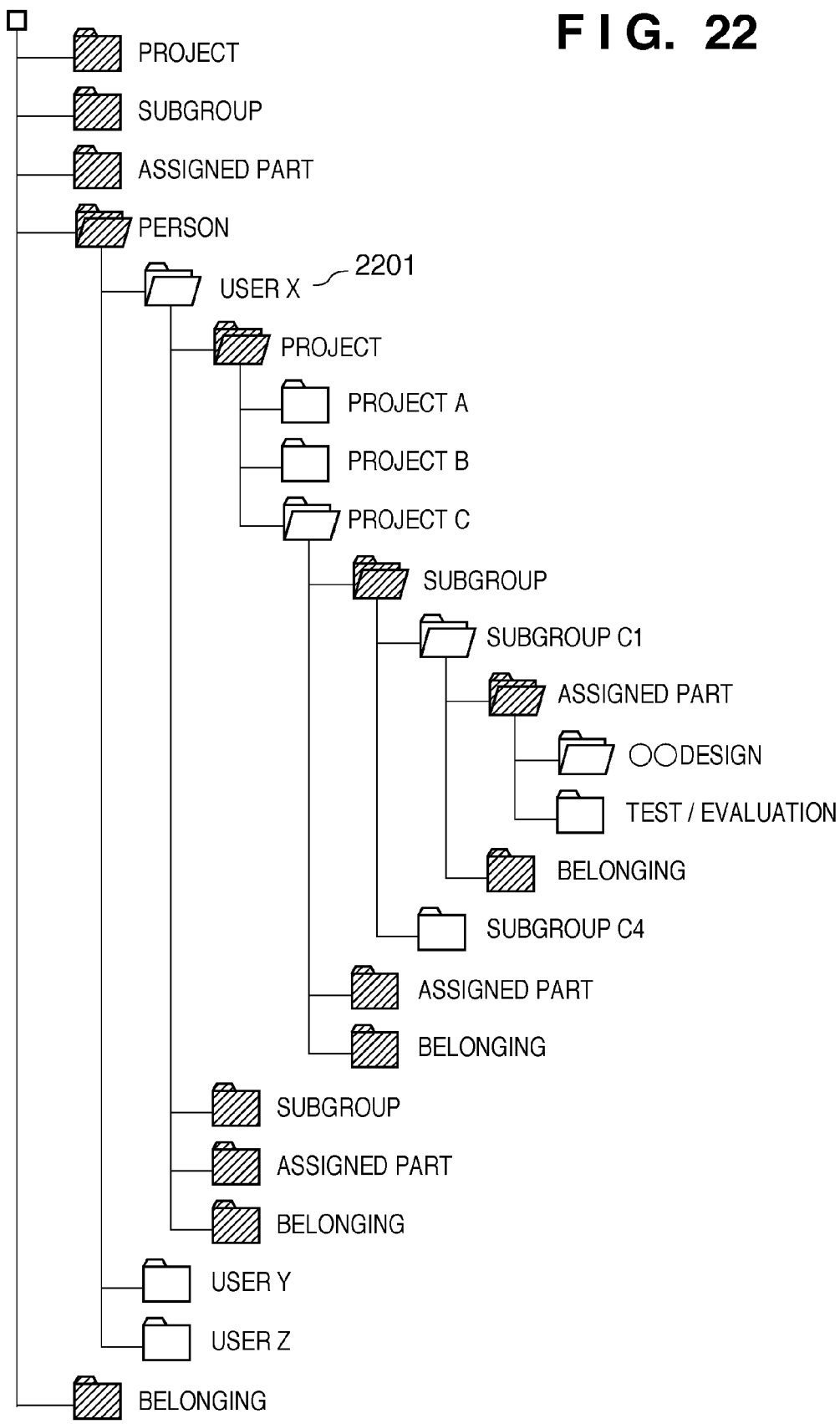
FIG. 22 is a view showing an example of a classification folder tree according to the third embodiment of the present invention.

FIG. 22 is a view showing an example of a classification folder tree according to this embodiment. The folder tree implements classification by alternately displaying folders (hatched folders) representing attribute items and folders (white folders) representing attribute values.

Figure 19:
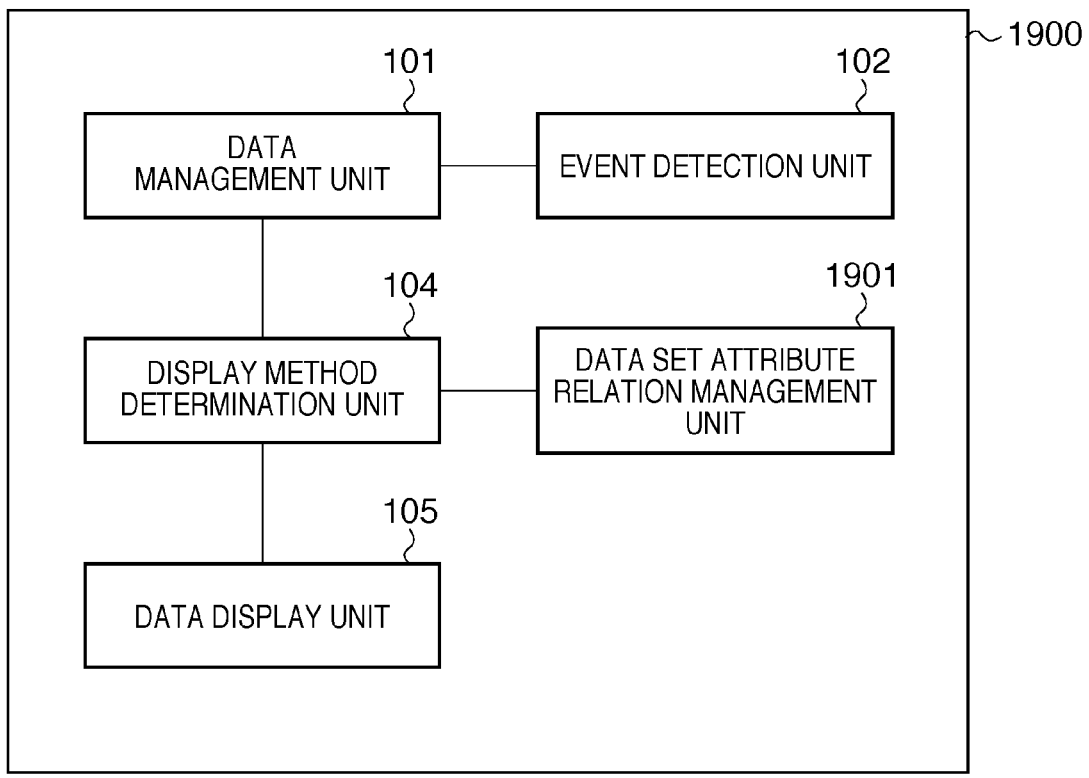
FIG. 19 is a block diagram showing an example of the functional arrangement of a data display apparatus according to the third embodiment of the present invention.

The arrangement of a data display apparatus according to this embodiment will be described with reference to FIG. 19. FIG. 19 is a block diagram showing an example of the functional arrangement of a data display apparatus 1900 according to this embodiment.

The data display apparatus 1900 according to the third embodiment includes no calculation unit 103 but a data set attribute relation management unit 1901, unlike the data display apparatus 100 of the first embodiment. The data set attribute relation management unit 1901 can be implemented using the hardware elements of the data display apparatus shown in FIG. 2. In this embodiment, the criterion to be used to determine whether to integrate a plurality of folders is only the relation information between the attribute items of folders.

Figure 20:
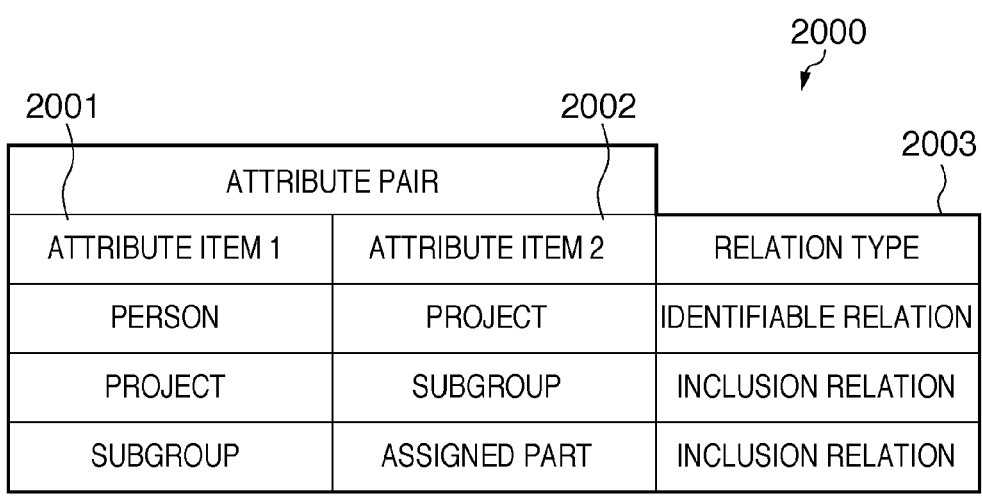
FIG. 20 is a view showing an example of a folder attribute relation management table according to the third embodiment of the present invention.

FIG. 20 shows an example of a folder attribute relation management table 2000. An attribute item 1 2001 and an attribute item 2 2002 of an attribute pair have a pair relation. A relation type 2003 indicates the type of relation of each attribute pair.

The relation type 2003 represents the relation to the attribute item 2 2002 viewed from the attribute item 1 2001 of each attribute pair. The relation types include a first relation "identifiable relation" and a second relation "inclusion relation". The "identifiable relation" is a relation such as "person"-"project" in which when a "person" is specified, a "project" associated with the "person" can almost be specified (identified) but not vice versa. That is, even when a "project" is specified, the person associated with the project cannot always be specified, although it depends on the scale of the project.

The inclusion relation is a relation in which the attribute item 1 2001 of an attribute pair includes the attribute item 2 2002. The inclusion relation can also be regarded as, e.g., a belonging relation or a dependent relation. For example, a relation "project"-"subgroup" indicates that a "project" can include a "subgroup".

Figure 21:
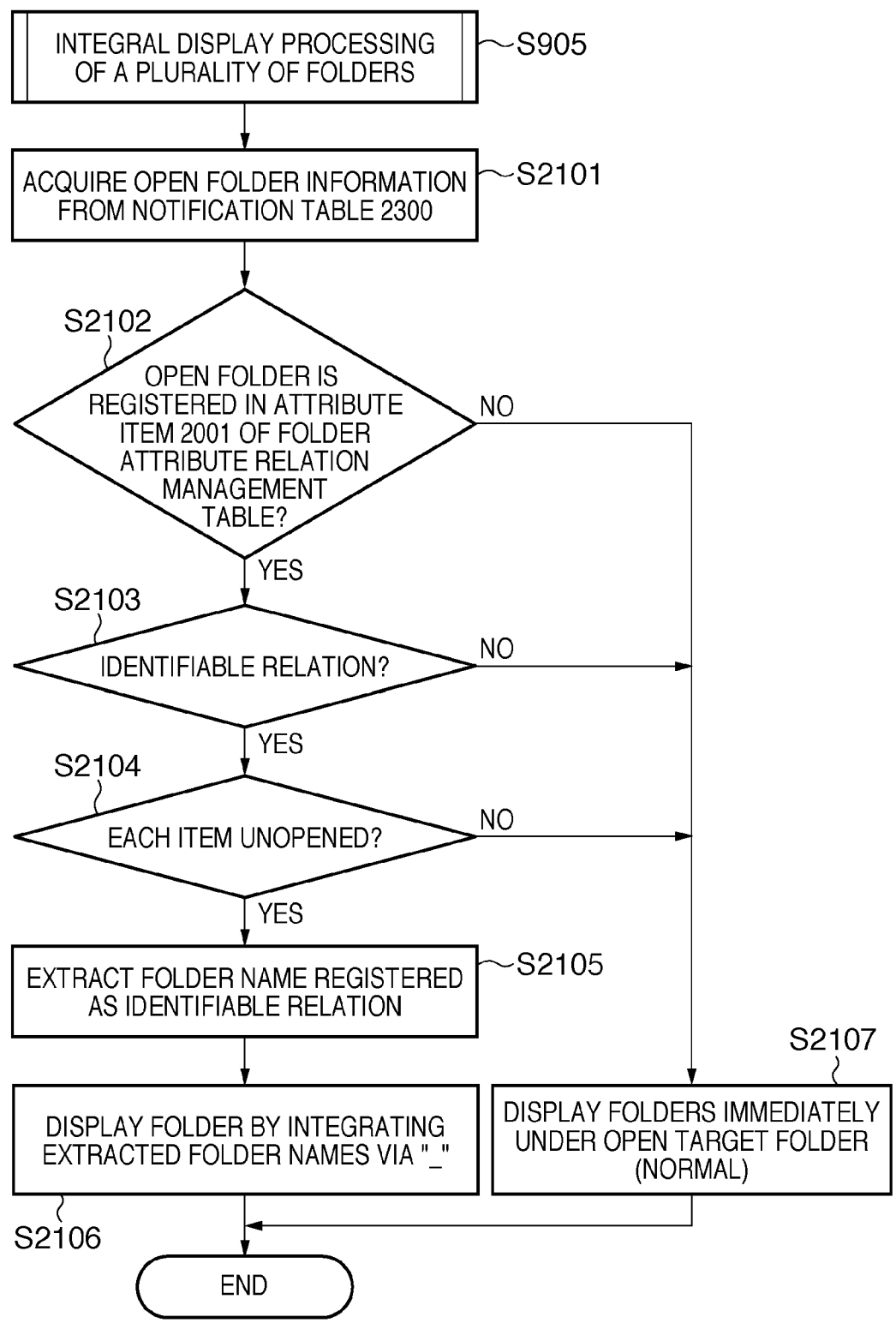
FIG. 21 is a flowchart illustrating an example of processing of integrally displaying a plurality of folders according to the third embodiment of the present invention.

FIG. 21 is a flowchart illustrating processing of integrally displaying a plurality of folders using the relation between attribute items. Assume that the classification folder tree shown in FIG. 22 defines the relation shown in the folder attribute relation management table 2000.

Figures 23, 24:
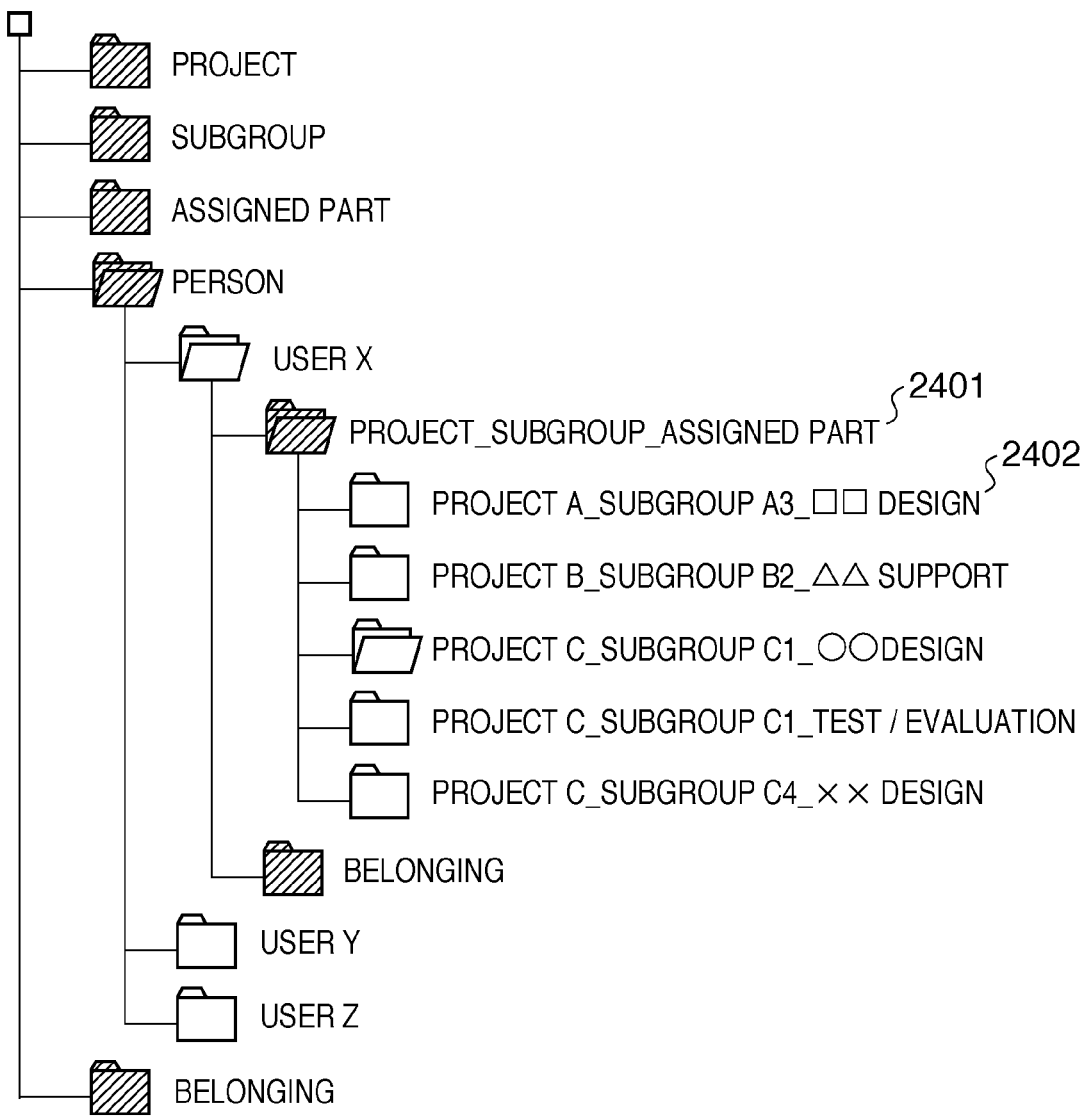
FIG. 23 is a view showing an example of a notification table according to the third embodiment of the present invention.
FIG. 24 is a view showing an example of an integrally displayed folder tree according to the third embodiment of the present invention.

In step S2101, when a folder "user X 2201" is opened, open folder information is acquired from a notification table 2300 shown in FIG. 23. The notification table 2300 manages only the information of attribute items but no information about attribute values. When the folder "user X 2201" is opened, an attribute item "person" having a value "user X" is managed in an attribute item 2301 of the open target folder in the notification table 2300. An attribute item 2302 of an opened folder stores an already opened attribute item. In the example shown in FIG. 23, the attribute item 2302 stores "-" because there is no already opened attribute item.

In step S2102, it is confirmed whether the opened folder is registered in the attribute item 1 2001 of the folder attribute relation management table 2000. If the folder is registered ("YES" in step S2102), the process advances to step S2103. If the folder is not registered, the process advances to step S2107. In step S2103, it is determined whether the relation type is "identifiable relation". If the relation type is "identifiable relation" ("YES" in step S2103), the process advances to step S2104. Otherwise ("NO" in step S2103), the process advances to step S2107.

In step S2104, it is determined whether the item of the attribute item 2 2002 of the "identifiable relation" in the folder attribute relation management table and each item having the inclusion relation with the item of the attribute item 2 2002 of the "identifiable relation" have not already been opened. The determination is done based on whether the attribute item 2302 of the opened folder stores the item of the attribute item 2 2002 of the "identifiable relation" in the folder attribute relation management table and each item having the inclusion relation with the attribute item 2 2002 of the "identifiable relation". If the items have not been opened ("YES" in step S2104), the process advances to step S2105. If the items have been opened ("NO" in step S2104), the process advances to step S2107.

In step S2105, folder names stored in the item of the attribute item 2 2002 of the "identifiable relation" and each item having the inclusion relation with the attribute item 2 2002 of the "identifiable relation" are extracted from the folder attribute relation management table 2000. In step S2106, folder names are displayed by connecting the extracted folder names via "underbars "_"". Note that in step S2107, not special processing but normal processing is performed to display the folders that exist immediately under the open target folder.

When the folder is opened, a folder name generated by connecting the attribute values corresponding to the attribute items is displayed. FIG. 24 shows an example of an integrally displayed folder tree. When a folder "project_subgroup_assigned part 2401" having a folder name formed by connecting the attribute items is opened, a folder name "project A_subgroup A3_☐☐ design 2402" having a folder name obtained by connecting the attribute values corresponding to the attribute items is displayed. When the folder formed by connecting the attribute values is opened, a result equivalent to that obtained by opening all the connected folders is displayed. In this embodiment, the inclusion relation has been exemplified. However, the procedure can also be implemented in any other relation, as a matter of course.

As described above, according to this embodiment, it is possible to integrally display a plurality of folder layers in accordance with the predefined relation between folders.

Fourth Embodiment

Figure 25:
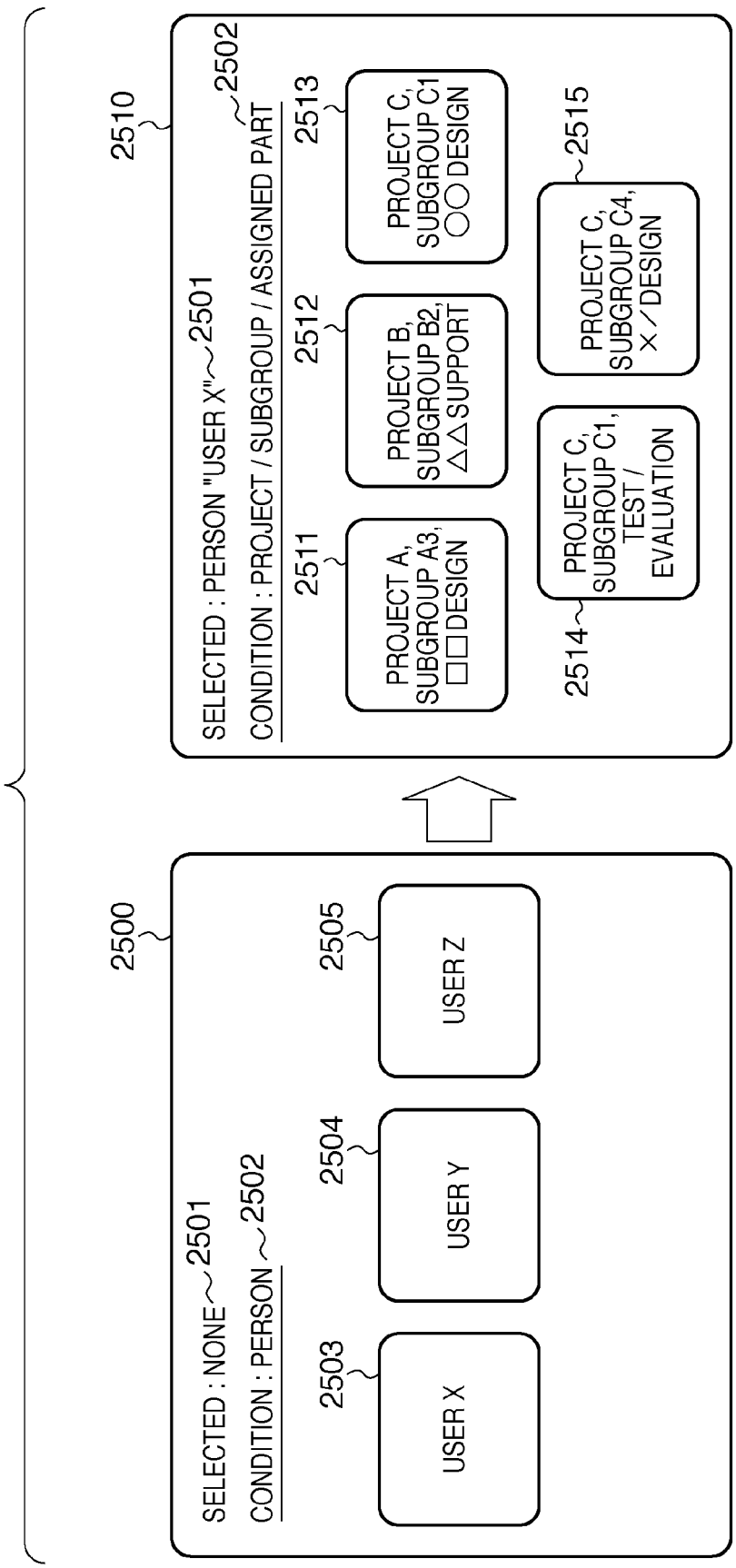
FIG. 25 is a view showing an example of a display form according to the fourth embodiment of the present invention.

The fundamental arrangement of the fourth embodiment of the present invention is based on the third embodiment. However, unlike the third embodiment, not a folder tree but only target items are displayed. FIG. 25 shows an example of a method of displaying only target items in the same operation as in FIG. 22.

A window 2500 displays a field 2501 which indicates an already selected item and a field 2502 which indicates a currently selected item as a condition. In the window 2500, no already selected item exists. For this reason, "none" is displayed in the field 2501. "Person" is displayed in the field 2502 as a currently selected item.

In this embodiment, a folder corresponding to the item selected as a condition is displayed as an icon. The icon represents a data set, like a folder. In FIG. 25, "person" is selected as the condition, and items of a user X 2503, user Y 2504, and user Z 2505 corresponding to the condition are displayed as icons. When the user X 2503 is selected, the display window transits to a window 2510 of the user X.

In the window 2510, "person "user X"" is displayed in the field 2501 as an already selected item. In addition, "project/subgroup/assigned part" is displayed in the field 2502 as a condition. Items corresponding to the condition are displayed as icons 2511 to 2515. In this way, each selected item is opened, and items included in it are displayed as icons.

Note that the form shown in FIG. 25 is merely an example, and any other display form can also be implemented, as a matter of course.

Fifth Embodiment

Figure 26:
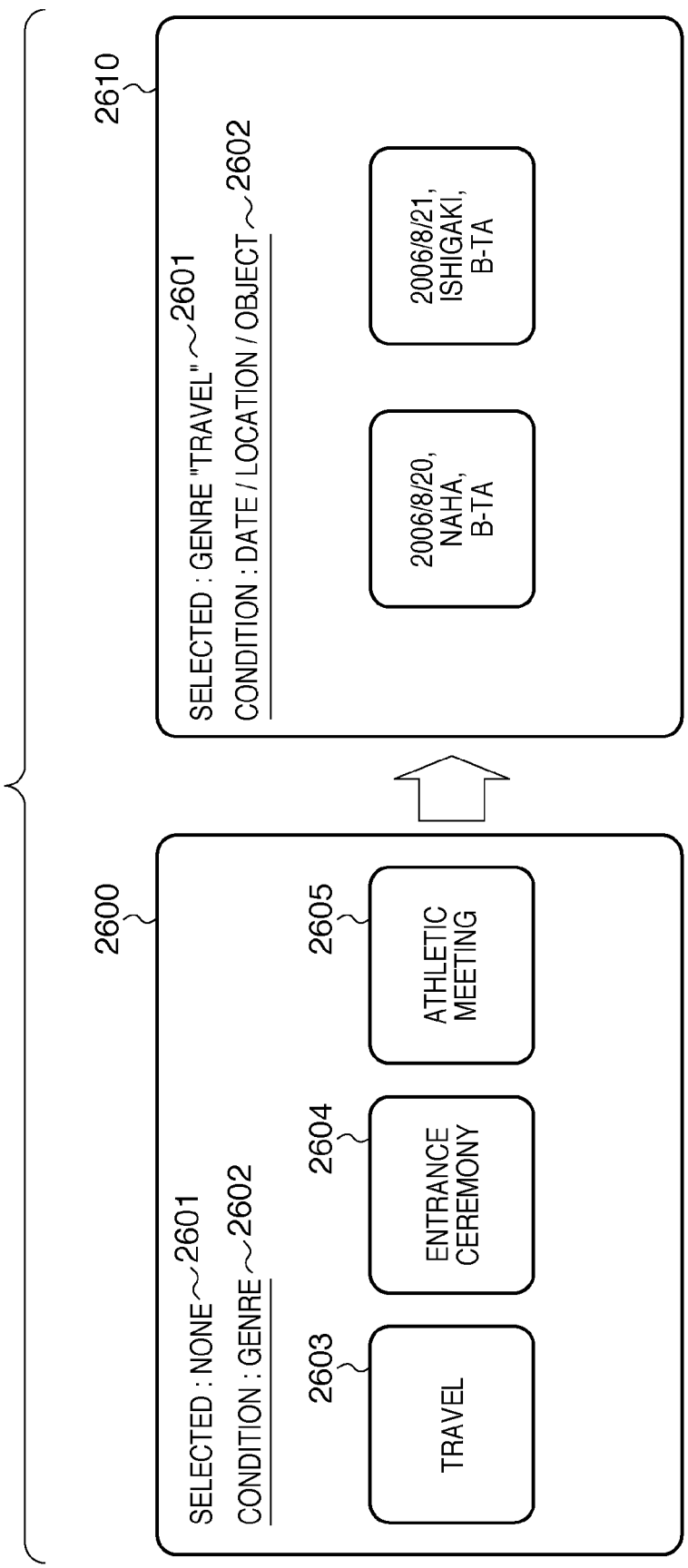
FIG. 26 is a view showing an example of a display form according to the fifth embodiment of the present invention.

Even for the folder layers shown in FIG. 3 of the first embodiment, a relation can be defined in advance between the folders in accordance with the third embodiment, and a plurality of folder layers can integrally be displayed based on the definition. FIG. 26 shows an example in which only target items are displayed according to the fourth embodiment in such a case.

The display form in FIG. 26 is the same as in FIG. 25. A window 2600 displays a field 2601 which indicates an already selected item and a field 2602 which indicates a currently selected item as a condition. In the window 2600, no already selected item exists. For this reason, "none" is displayed in the field 2601. "Genre" is displayed in the field 2602 as a condition. Items corresponding to "genre", i.e., "travel 2603", "entrance ceremony 2604", and "athletic meeting 2605" are displayed as icons. When "travel 2603" is selected as the genre, a window 2610 is displayed.

Note that the form shown in FIG. 26 is merely an example, and any other display form can also be implemented, as a matter of course.

Sixth Embodiment

The fundamental arrangement of the sixth embodiment of the present invention is based on the first embodiment. However, unlike the first embodiment, a plurality of folder layers are integrally displayed in accordance with the user's operation history.

Figure 27:
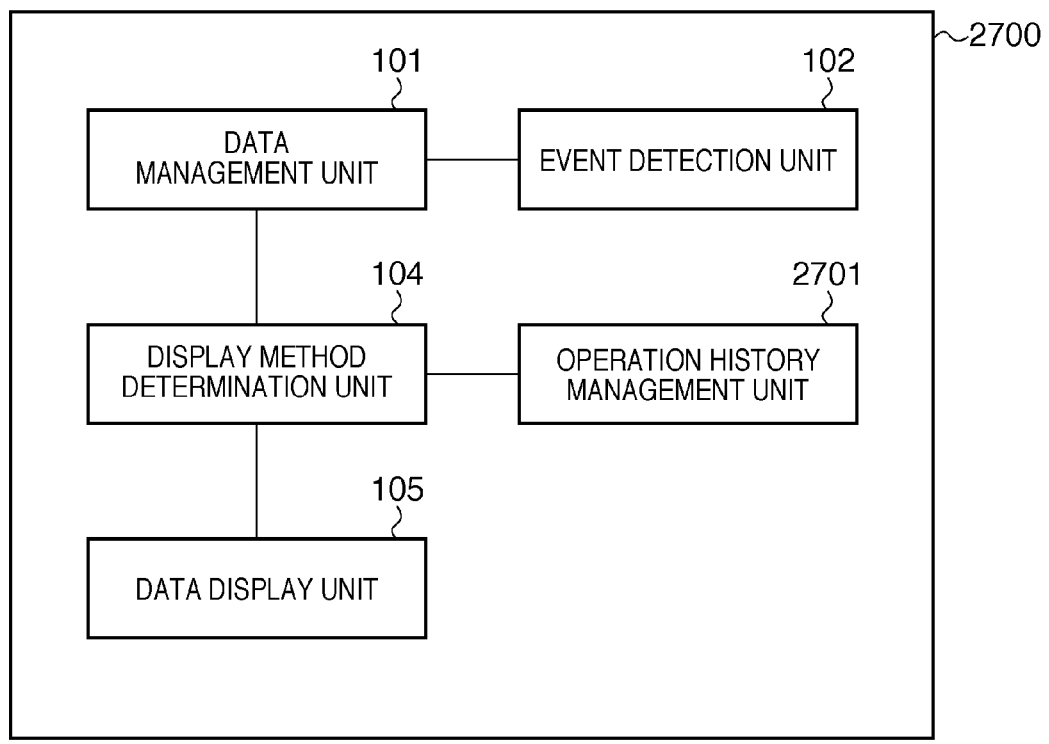
FIG. 27 is a block diagram showing an example of the functional arrangement of a data display apparatus according to the sixth embodiment of the present invention.

FIG. 27 is a block diagram showing the functional arrangement of a data display apparatus 2700 according to the present invention. The data display apparatus 2700 includes no calculation unit 103 but an operation history management unit 2701, unlike the data display apparatus 100 of the first embodiment. FIG. 28 shows an example of an operation history management table 2800 according to this embodiment in the folder arrangement shown in FIG. 4. This table manages the following five kinds of information.

A folder name 2801 manages the name of each folder. A folder path 2802 manages the path information of the storage location of each folder. The number 2803 of times of opening manages the number of times of opening operations of each folder. The number 2804 of times of operations manages the number of times of operations of data in each folder. An operation rate 2805 manages the rate of operations of data that exists immediately under an opened folder.

Figure 29:
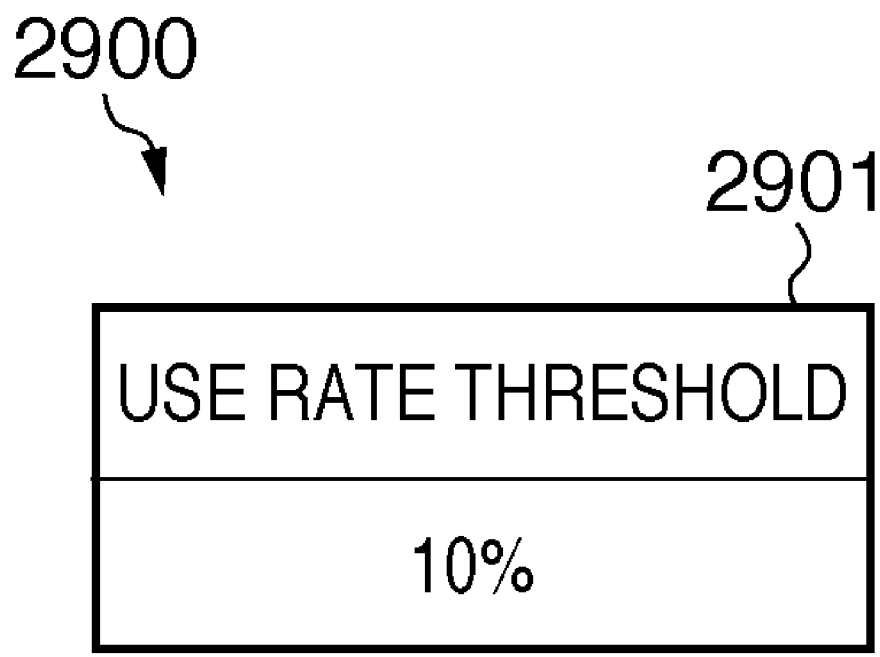
FIG. 29 is a view showing an example of a use rate management table according to the sixth embodiment of the present invention.

FIG. 29 shows an example of a use rate management table 2900. The use rate management table 2900 registers a use rate threshold 2901 which is compared with the operation rate 2805 of a folder to determine whether to integrate folders. In FIG. 29, the value of the use rate threshold 2901 is "10%".

An example will be described here in which a folder "Okinawa 412" is opened in the folder tree shown in FIG. 4. First, folders "2006/8/20 413" and "2006/8/21 416" which exist immediately under the folder "Okinawa 412" are processed.

The use rate threshold 2901 managed in the use rate management table 2900 is compared with the value of the operation rate 2805 of each folder managed in the operation history management table 2800. If the value of the operation rate is equal to or smaller than the use rate threshold as the result of comparison, the same comparison processing is executed for all folders which exist immediately under the folder. In the example shown in FIG. 28, the operation rates 2805 of the folders "2006/8/20" and "2006/8/21" are "6%" and "4%", respectively. Both values are smaller than the use rate threshold 10%. Folders that exist immediately under these folders are "Naha" and "Ishigaki". The operation rates 2805 of these folders are "13%" and "2%", respectively. The operation rate value of "Naha" is larger than the use rate threshold. On the other hand, the operation rate of "Ishigaki" is lower than the use rate threshold. A folder "B-ta" exists immediately under "Ishigaki", and its operation rate is "93%", i.e., higher than the use rate threshold.

As described above, the comparison processing is repeated in the order of layers until a folder whose operation rate 2805 is higher than the use rate threshold is detected. When the operation rate exceeds the threshold, folders up to that layer are integrally displayed as one folder.

As an example of the integration method, a folder name formed by connecting a plurality of folder names via "_" is displayed. In the above-described case, "2006/8/20_Naha" and "2006/8/21_Ishigaki_B-ta" are displayed.

In the above example, when the operation rates 2805 of all folders in a single layer are equal to or lower than the threshold, folders from the layer of the opened folder up to that single layer are integrated. However, any other integration form is applicable. For example, even in a single layer, only folders that can be integrated are integrally displayed, and the remaining folders that cannot be integrated are displayed in the normal form.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001823, filed Jan. 7, 2009, which is hereby incorporated by reference herein in its entirety.

What is claimed is:

1. A data display apparatus comprising:
a display unit operable to hierarchically display a plurality of folders;
a management unit operable to manage information of the number of lowermost layer folders associated with each of the plurality of folders and of data included in each of the plurality of folders and to manage history information of data operations for data included in one of the plurality of folders;
a determination unit operable to, when said display unit displays each of the plurality of folders, determine to integrally display a plurality of lower folders involving the lowermost layer folders included under the folder as an integrated folder, when the number of the lowermost layer folders under the folder is not more than a first predetermined threshold and to calculate, for each folder, a frequency of data operations based on the history information data operations, to detect a lower folder, for which the frequency calculated for each folder exceeds a second predetermined threshold, sequentially from the folder to be displayed to a folder of a lower layer, and to determine to integrally display folders included in layers from the folder to be displayed to the detected lower folder; and
a control unit operable to control to cause said display unit to perform integral display using the integrated folder when said determination unit has determined to perform the integral display.

2. The apparatus according to claim 1, wherein when said determination unit has determined to perform the integral display, said control unit further operable to control to form a name of the integrated folder by merging a name of the folder to be integrally displayed and names of the plurality of lower folders included under that folder and cause said display unit to perform the integral display.

3. The apparatus according to claim 2, wherein said control unit further operable to form the name of the integrated folder by merging names of folders other than a folder designated in advance.

4. The apparatus according to claim 3, wherein said management unit further operable to manage a relation of a folder to an upper folder having a folder name corresponding to a superordinate concept of that folder, and
said control unit further operable to form the name of the integrated folder by merging names of folders other than the upper folder.

5. The apparatus according to claim 1, wherein said determination unit further operable to acquire the number of data included under the lowermost layer folders from said management unit, and to determine to integrally display the lowermost layer folders including data in number not more than a third predetermined threshold.

6. The apparatus according to claim 1, wherein said control unit further operable to cause said display unit to discriminately display the integrated folder from other folders.

7. A data display method comprising steps of:
causing a display unit to hierarchically display a plurality of folders;
causing a management unit to manage information of the number of lowermost layer folders associated with each of the plurality of folders and of data included in each of the plurality of folders and to manage history information of data operations for data included in one of the plurality of folders;
causing a determination unit to, when the display unit displays each of the plurality of folders, determine to integrally display a plurality of lower folders involving the lowermost layer folders included under the folder as an integrated folder, when the number of the lowermost layer folders under the folder is not more than a first predetermined threshold and to calculate, for each folder, a frequency of data operations based on the history information data operations, to detect a lower folder, for which the frequency calculated for each folder exceeds a second predetermined threshold, sequentially from the folder to be displayed to a folder of a lower layer, and to determine to integrally display folders included in layers from the folder to be displayed to the detected lower folder; and
causing a control unit to control to cause the display unit to perform integral display using the integrated folder when it is determined in the determination step to perform the integral display.

8. A non-transitory computer-readable storage medium storing a computer program that causes a computer to function as a data display apparatus comprising:
a display unit operable to hierarchically display a plurality of folders;

a management unit operable to manage information of the number of lowermost layer folders associated with each of the plurality of folders and of data included in each of the plurality of folders and to manage history information of data operations for data included in one of the plurality of folders;

a determination unit operable to, when said display unit displays each of the plurality of folders, determine to integrally display a plurality of lower folders involving the lowermost layer folders included under the folder as an integrated folder, when the number of the lowermost layer folders under the folder is not more than a first predetermined threshold and to calculate, for each folder, a frequency of data operations based on the history information data operations, to detect a lower folder, for which the frequency calculated for each folder exceeds a second predetermined threshold, sequentially from the folder to be displayed to a folder of a lower layer, and to determine to integrally display folders included in layers from the folder to be displayed to the detected lower folder; and a control unit operable to control to cause said display unit to perform integral display using the integrated folder when said determination unit has determined to perform the integral display.

* * * * *